United States Patent
Kayama

(10) Patent No.: US 11,850,541 B2
(45) Date of Patent: Dec. 26, 2023

(54) EXHAUST GAS PURIFICATION FILTER

(71) Applicant: DENSO CORPORATION, Kariya (JP)

(72) Inventor: Hiroaki Kayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 33 days.

(21) Appl. No.: 17/575,309

(22) Filed: Jan. 13, 2022

(65) Prior Publication Data

US 2022/0176298 A1 Jun. 9, 2022

Related U.S. Application Data

(63) Continuation of application No. PCT/JP2020/027330, filed on Jul. 14, 2020.

(30) Foreign Application Priority Data

Jul. 31, 2019 (JP) .................... 2019-141520

(51) Int. Cl.
*B01D 46/24* (2006.01)

(52) U.S. Cl.
CPC ... *B01D 46/2429* (2013.01); *B01D 46/24491* (2021.08); *B01D 46/24492* (2021.08); *B01D 2279/30* (2013.01)

(58) Field of Classification Search
CPC .......... B01D 46/2429; B01D 46/24491; B01D 2279/30
USPC ....................................................... 55/523
See application file for complete search history.

(56) References Cited

U.S. PATENT DOCUMENTS

| | | | |
|---|---|---|---|
| 2006/0166820 A1 | 7/2006 | Ogyu et al. | |
| 2006/0210765 A1 | 9/2006 | Ohno et al. | |
| 2009/0142543 A1* | 6/2009 | Suwabe | B01D 46/24491 264/43 |
| 2009/0291252 A1 | 11/2009 | Ohno et al. | |
| 2009/0291256 A1* | 11/2009 | Ohno | B01D 46/247 428/117 |
| 2014/0290196 A1* | 10/2014 | Tsuchiya | C04B 38/0006 264/631 |

FOREIGN PATENT DOCUMENTS

| | | |
|---|---|---|
| EP | 2 644 245 | 10/2013 |
| EP | 3 275 541 | 1/2018 |
| JP | 2010-260787 | 11/2010 |
| JP | JPWO2013/145210 | 8/2015 |

* cited by examiner

*Primary Examiner* — Robert A Hopkins
*Assistant Examiner* — Qianping He
(74) *Attorney, Agent, or Firm* — Nixon & Vanderhye P.C.

(57) ABSTRACT

An exhaust gas purification filter includes a plurality of cells extending in a filter axial direction, a porous partition separating and defining the plurality of cells, and a sealing section sealing the plurality of cells alternately at both filter ends. The partition has a void volume of a reduced dale, Vvv, and a material volume of a reduced peak, Vmp, as volume parameters determined in noncontact surface roughness measurement on a surface of the partition, with their total value being more than 1.3 $\mu m^3/\mu m^2$ and 1.7 $\mu m^3/\mu m^2$ or less. The partition has a mean pore size of 12 $\mu m$ or more and 20 $\mu m$ or less. The partition also has a porosity of 50% or more and 75% or less.

2 Claims, 16 Drawing Sheets

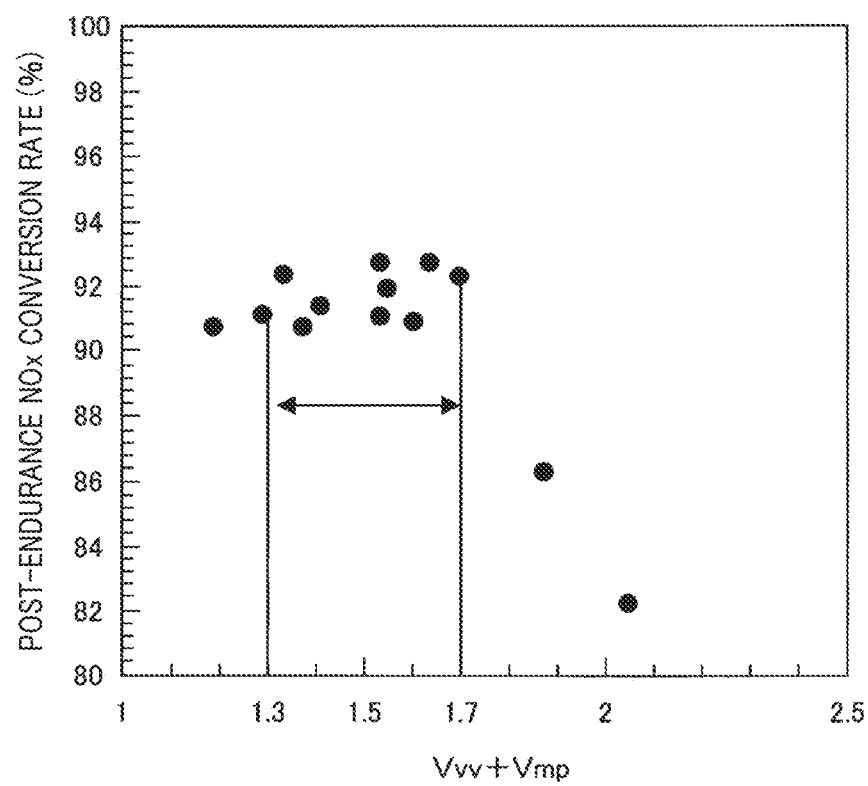

EXHAUST GAS PURIFICATION FILTER

This application is a U.S. continuation application of International Application No. PCT/JP2020/027330 filed on Jul. 14, 2020 which designated the U.S. and claims the benefit of Japanese Patent Application No. 2019-141520 filed on Jul. 31, 2019, the contents of each of which are incorporated herein by reference.

BACKGROUND

The present disclosure relates to an exhaust gas purification filter.

Exhaust gas emitted from internal combustion engines such as gasoline engines and diesel engines contains particulate matter (hereinafter, sometimes referred to as PM) called particulates. To purify exhaust gas by trapping PM in the exhaust gas, an exhaust gas purification filter is installed in the exhaust passage of an internal combustion engine. A typical exhaust gas purification filter includes a plurality of cells extending in the filter axial direction, a porous partition separating and defining the plurality of cells, and a sealing section sealing the plurality of cells alternately at both filter ends.

SUMMARY

An aspect of the present disclosure relates to an exhaust gas purification filter including a plurality of cells, a porous partition, and a sealing section, wherein the partition has a void volume Vvv of a reduced dale and a material volume Vmp of a reduced peak as volume parameters determined in noncontact surface roughness measurement on a surface of the partition, with their total value being more than 1.3 $\mu m^3/\mu m^2$ and 1.7 $\mu m^3/\mu m^2$ or less;

the partition has a mean pore size of 12 μm or more and 20 μm or less; and the partition has a porosity of 50% or more and 75% or less.

BRIEF DESCRIPTION OF THE DRAWINGS

The above and other objects, features, and advantages of the present disclosure will be clearly apparent from the detailed description provided below with reference to the accompanying drawings, in which:

FIG. 22 shows the relationship found in the experimental example between the total value of the void volume Vvv of the reduced dale and the material volume Vmp of the reduced peak of a partition surface determined in noncontact surface roughness measurement (horizontal axis), and the NOx conversion rate after endurance (vertical axis).

DETAILED DESCRIPTION OF THE PREFERRED EMBODIMENTS

Figure 1:
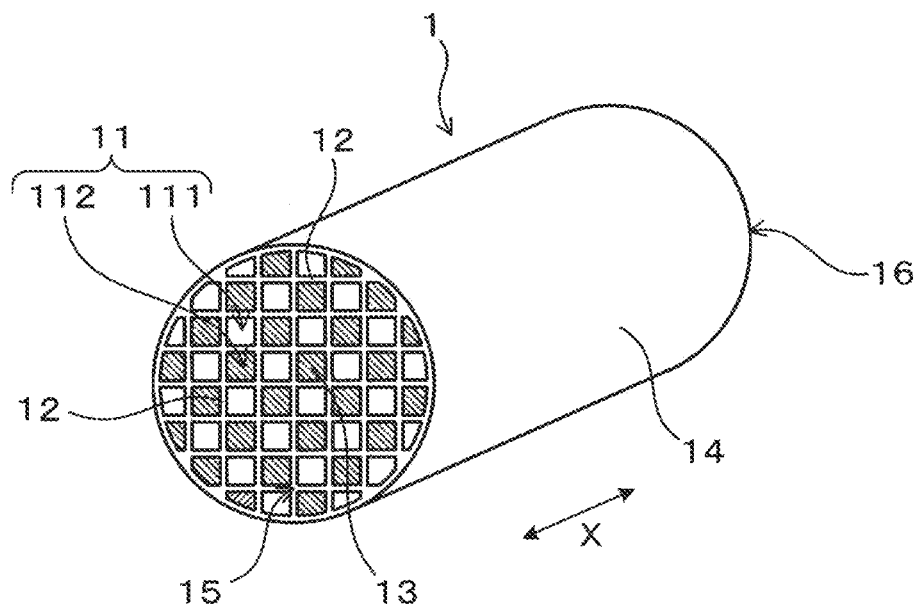
FIG. 1 is a perspective view of an exhaust gas purification filter according to a first embodiment.

A typical exhaust gas purification filter includes a plurality of cells extending in the filter axial direction, a porous partition separating and defining the plurality of cells, and a sealing section sealing the plurality of cells alternately at both filter ends.

The amount of PM emitted from a gasoline engine is much smaller than the amount of PM emitted from a diesel engine. However, due to regulations introduced for the number of PM particles, vehicles having a gasoline engine (hereinafter, gasoline vehicles) also need to incorporate a gasoline particulate filter (hereinafter, sometimes referred to as a GPF) that is an exhaust gas purification filter for trapping PM emitted from the gasoline engine.

In addition to PM trapping, some GPFs are needed to have a partition coated with a catalyst for the purification of exhaust gas and convert NOx as in conventional catalytic devices.

WO2009/141883 A, which is a prior art document, discloses a technique for converting NOx in exhaust gas through a catalyst supported on a partition in a honeycomb structure. More specifically, according to this literature, the partition has a surface roughness Ra, defined in JIS B 0601, increased to 1 μm or more, and thus the increased surface area of the partition allows NOx conversion reactions to occur in a larger area, while the surface roughness Ra of the partition is controlled to 30 μm or less, thus preventing a reduction in permeability of the partition to exhaust gas and improving the NOx conversion rate.

Demand for GPFs with higher NOx conversion efficiency is expected to grow yearly. To improve NOx conversion efficiency, catalytic devices use honeycomb structures having an increased amount of catalyst supported on the partition surface. However, if such a method is used for an exhaust gas purification filter in which exhaust gas passes through the partition, pores in the partition will be blocked by the catalyst. As a result, the exhaust gas purification filter suffers from a decrease in PM collection efficiency and an increase in pressure loss (hereinafter, sometimes referred to as a pressure drop) in the initial stage.

An object of the present disclosure is to provide an exhaust gas purification filter that can achieve a higher initial NOx conversion rate while maintaining the initial PM collection efficiency and reducing the initial pressure drop, without increasing the amount of catalyst.

An aspect of the present disclosure relates to an exhaust gas purification filter including a plurality of cells extending in the filter axial direction, a porous partition separating and defining the plurality of cells, and a sealing section that sealing the plurality of cells alternately at both filter ends, wherein the partition has a void volume Vvv of a reduced dale and a material volume Vmp of a reduced peak as volume parameters determined in noncontact surface roughness measurement on a surface of the partition, with their total value being more than 1.3 μm³/μm² and 1.7 μm³/μm² or less;

the partition has a mean pore size of 12 μm or more and 20 μm or less; and the partition has a porosity of 50% or more and 75% or less.

The exhaust gas purification filter has the above specific configuration. The above exhaust gas purification filter can thus achieve a higher initial NOx conversion rate while maintaining the initial PM collection efficiency and reducing the initial pressure drop, without increasing the amount of catalyst.

First Embodiment

An exhaust gas purification filter 1 according to a first embodiment will now be described with reference to FIGS. 1 to 11. The direction indicated by double-headed arrows shown in FIGS. 1 to 3 is defined as a filter axial direction X of the exhaust gas purification filter 1.

Figure 2:
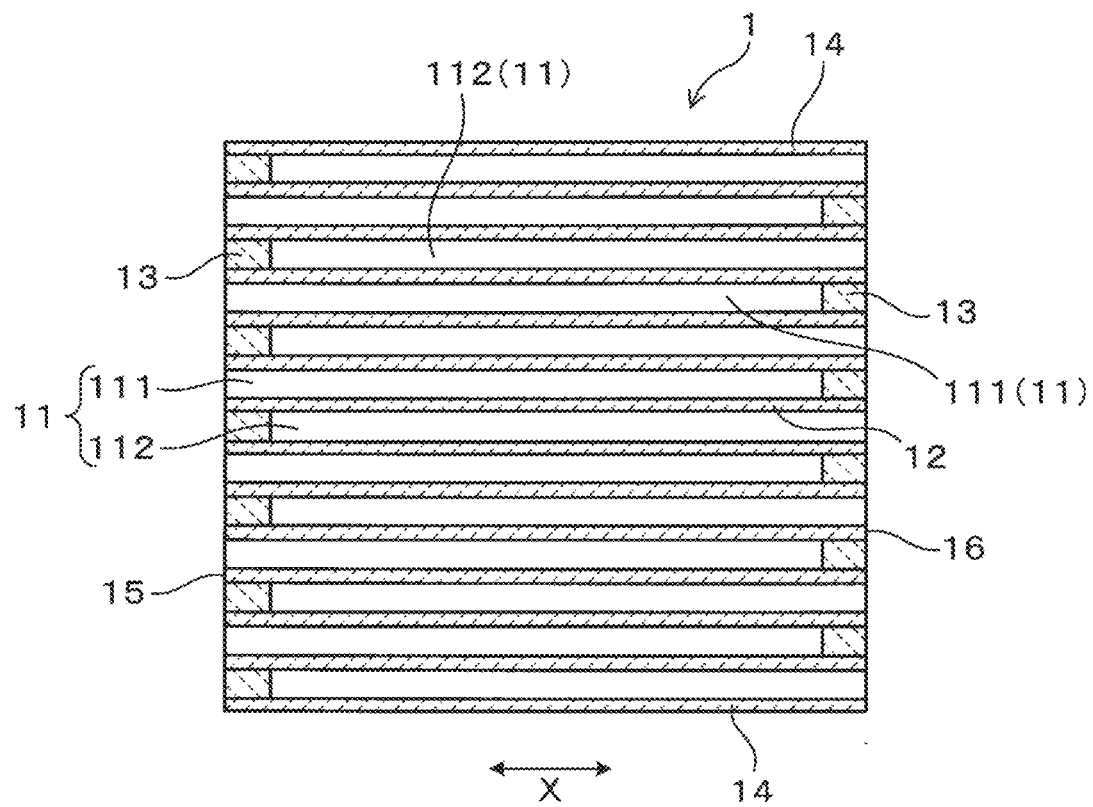
FIG. 2 is a cross-sectional view of the exhaust gas purification filter according to the first embodiment, taken in the filter axial direction.
Figure 3:
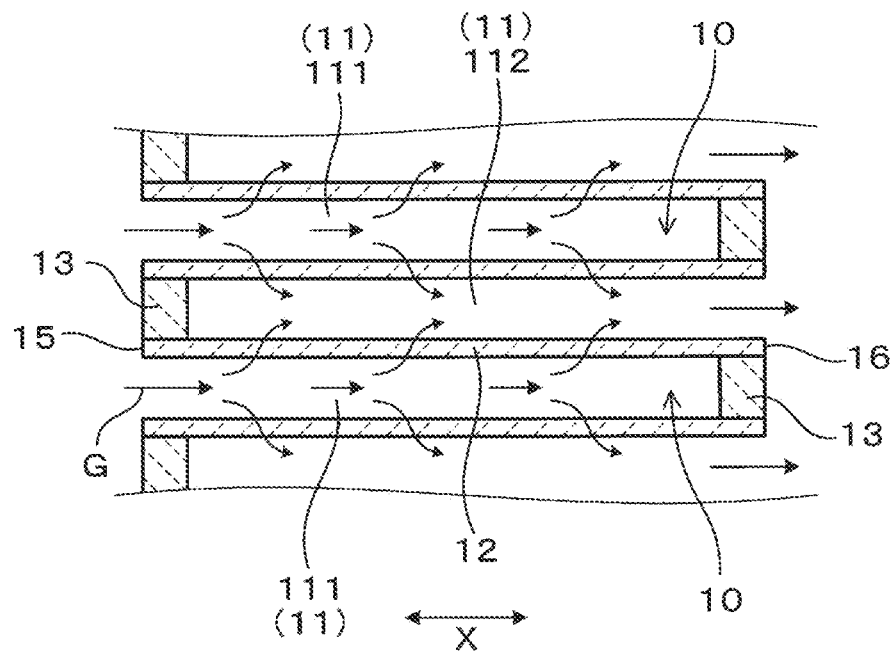
FIG. 3 illustrates the flow of exhaust gas in the exhaust gas purification filter according to the first embodiment.

As illustrated in FIGS. 1 to 3, the exhaust gas purification filter 1 includes a plurality of cells 11, a partition 12, and a sealing section 13.

As illustrated in FIGS. 1 to 3, the plurality of cells 11 extend in the filter axial direction X. More specifically, the plurality of cells 11 extend from an inlet end surface 15 that receives an inflow of exhaust gas G to an outlet end surface 16 that allows the exhaust gas G to flow out. As viewed in a cross section perpendicular to the filter axial direction X, the cells may have a shape such as a quadrangle, as illustrated in FIG. 1. The shape of the cells may not be limited to a quadrangle, but may be a polygon such as a triangle or a hexagon or a circle. The shape of the cells may also be a combination of two or more different shapes.

The partition 12 separates and defines the plurality of cells 11. More specifically, the partition 12 may be provided inside a skin in a cylindrical or otherwise tubular form as a grid-like shape as viewed in a cross section perpendicular to the filter axial direction X. In the exhaust gas purification filter 1, the partition 12 and the skin 14 may be formed of ceramic such as cordierite. The partition 12 may have a thickness of, for example, 120 μm to 360 μm.

The plurality of cells 11 include inlet cells 111 that receive an inflow of exhaust gas G and outlet cells 112 that allow the exhaust gas G to flow out. The inlet cells 111 and the outlet cells 112 may be arranged in a manner to, for example, alternate in the lateral direction orthogonal to the filter axial direction X as well as in the vertical direction orthogonal to both the filter axial direction X and the lateral direction. In this case, when the inlet end surface 15 or the outlet end surface 16 is viewed in the filter axial direction X, the inlet cells 111 and the outlet cells 112 are arranged, for example, in a checked pattern. The inlet cells 111 and the outlet cells 112 are adjacent to each other and separated by the partition 12 between them.

The sealing section 13 seals the plurality of cells 11 alternately at both filter ends. More specifically, the sealing section 13, as illustrated in FIG. 2, seals the openings of the outlet cells 112 in the inlet end surface 15 and the openings of the inlet cells 111 in the outlet end surface 16. Thus, the inlet cells 111 open in the inlet end surface 15, and the openings are blocked in the outlet end surface 16 by the sealing section 13 at the outlet side. The outlet cells 112 open in the outlet end surface 16, and the openings are blocked in the inlet end surface 15 by the sealing section 13 at the inlet side. The sealing section 13 may be formed of ceramic such as cordierite or other materials.

In the present embodiment, as illustrated in FIG. 3, the exhaust gas G flows into the inlet cells 111 from the inlet end surface 15 serving as an exhaust gas inlet. After flowing into the inlet cells 111, the exhaust gas G flows in the inlet cells 111 and the partition 12, which is porous, and enters the outlet cells 112. After entering the outlet cells 112, the exhaust gas G flows in the outlet cells 112. After flowing in the outlet cells 112, the exhaust gas G flows out from the outlet end surface 16 serving as an exhaust gas outlet.

Figure 4:
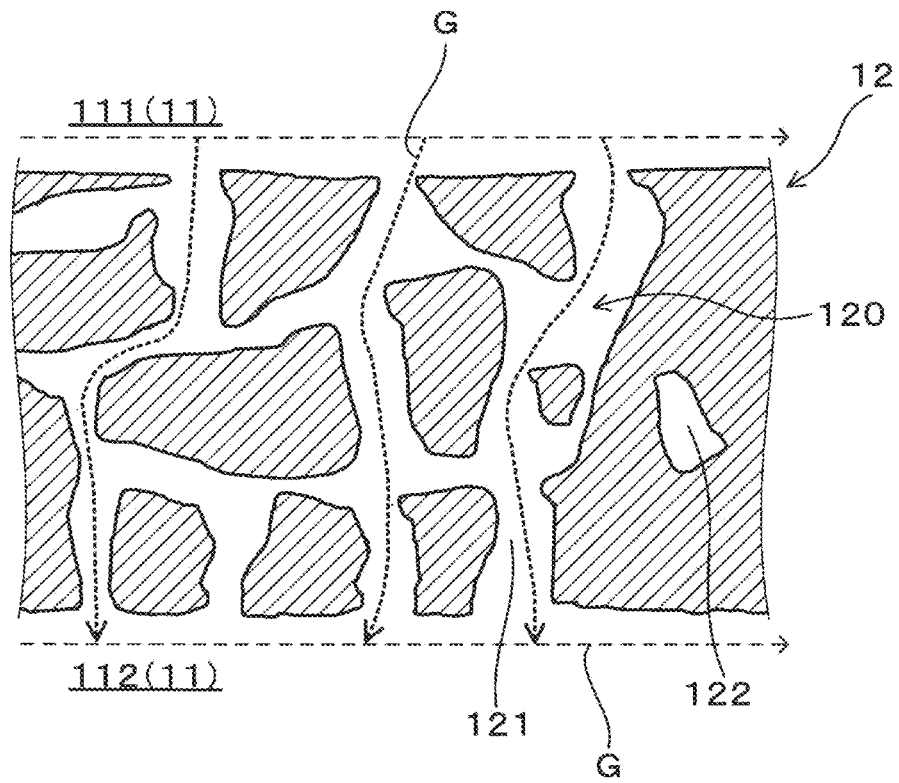
FIG. 4 schematically illustrates a cross section of a partition in the exhaust gas purification filter according to the first embodiment, taken in the thickness direction.

As illustrated in FIG. 4, the partition 12 is porous. In other words, the partition 12 has pores 120 in it. More specifically, the partition 12 may have communication channels 121 that allow communication between adjacent cells 11 across the partition 12. More specifically, the communication channels 121 open in the surface of the partition 12 facing incoming gas and the surface of the partition 12 facing outgoing gas. In other words, the communication channels 121 extend through the partition 12 to allow communication between the inlet cells 111 and the adjacent outlet cells 112. In the partition 12, the communication channels 121 serve as gas flow channels for the exhaust gas G. In addition to the communication channels 121, the partition 12 may include a non-communication hole 122 that does not allow communication between adjacent cells 11 across the partition 12.

Figure 5:
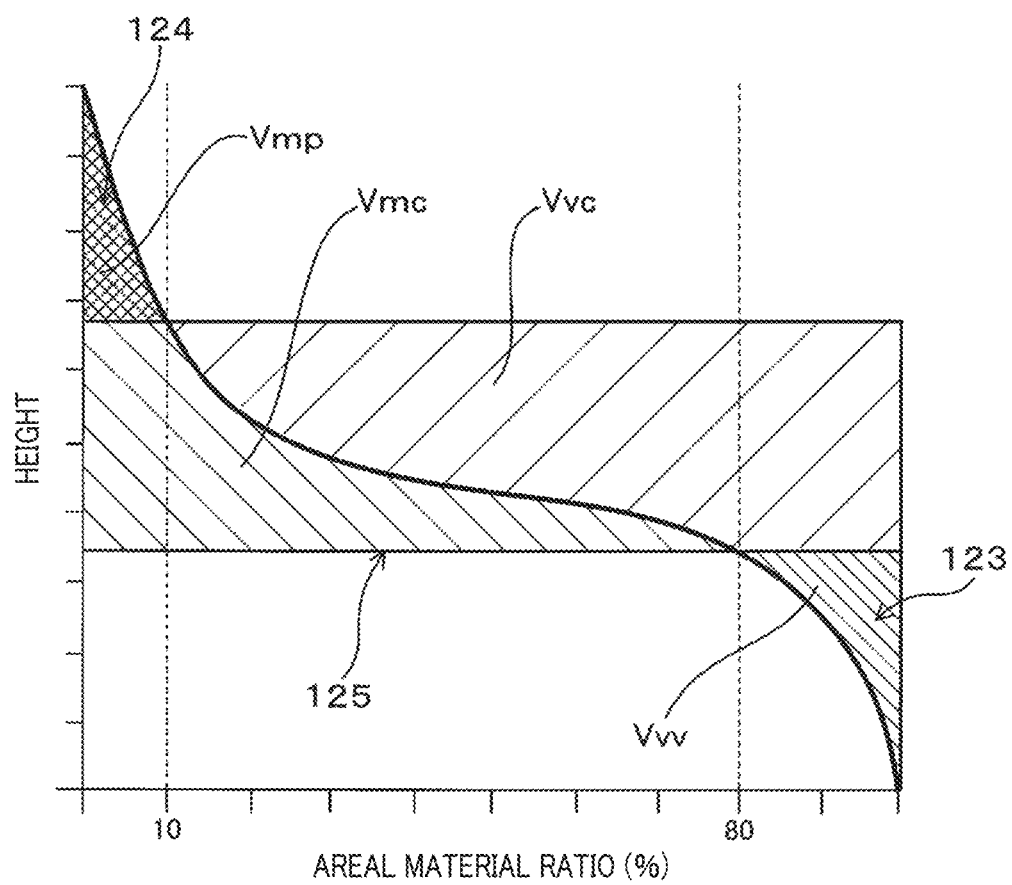
FIG. 5 shows an example material ratio curve determined in noncontact surface roughness measurement, with the horizontal axis indicating areal material ratios and the vertical axis indicating heights, illustrating a void volume Vvv of a reduced dale and a material volume Vmp of a reduced peak that are volume parameters of a partition surface.

As illustrated in FIG. 5, the partition 12 has the void volume of a reduced dale 123, Vvv, and the material volume of a reduced hill 124, Vmp, as volume parameters of the surfaces of the partition 12 determined in noncontact surface roughness measurement, with their total value (hereinafter, sometimes simply referred to as the total value of the volumes Vvv and Vmp) being more than 1.3 $\mu m^3/\mu m^2$ and 1.7 $\mu m^3/\mu m^2$ or less. The volumes Vvv and Vmp of the surfaces of the partition 12 can be measured by performing surface roughness measurement on the surface of the partition 12 facing incoming exhaust gas using a noncontact surface roughness measurement instrument capable of measuring volume parameters that are three-dimensional roughness parameters according to ISO 25178. This will be described in detail later.

The void volume of the reduced dale 123, Vvv, and the material volume of the reduced hill 124, Vmp, which are volume parameters defined in ISO 25178, will now be described with reference to FIG. 5. The surface roughness measurement performed on the measurement target surface with the noncontact surface roughness measurement instrument provides the relationship between areal material ratios (horizontal axis) and heights (vertical axis) as illustrated in FIG. 5, that is, a material ratio curve. In the measurement of the volumes Vvv and Vmp of the surfaces of the partition 12, as shown in FIG. 5, the height at an areal material ratio of 10% corresponds to the boundary between a core 125 and the reduced hill 124. The height at an areal material ratio of 80% corresponds to the boundary between the core 125 and the reduced dale 123. In other words, the material ratio curve shown in FIG. 5 is divided into the reduced hill 124, the core 125, and the reduced dale 123 at areal material ratios of 10% and 80%. The material volume of the reduced hill 124 is denoted by Vmp, and the void volume of the reduced dale 123 is denoted by Vvv. Note that the material volume of the core 125 is denoted by Vmc, and the void volume of the core 125 is denoted by Vvc.

Figure 6:
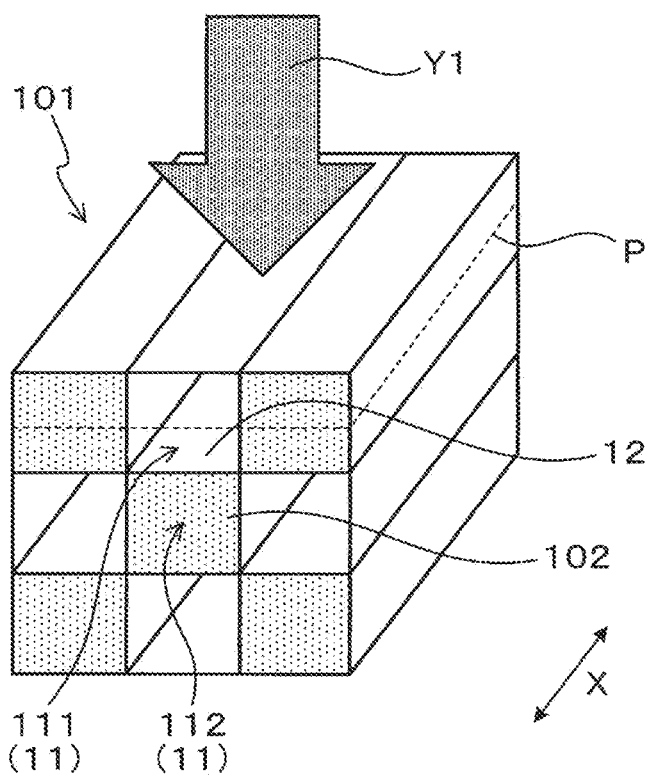
FIG. 6 schematically illustrates the shape of a partition portion extracted from the exhaust gas purification filter to measure the volumes Vvv and Vmp.

The volumes Vvv and Vmp are measured in the manner described below. More specifically, as shown in FIG. 6, a partition portion 101 is cut out from the exhaust gas purification filter 1. Note that the part with the sealing section 13 formed on it is excluded. The partition portion 101 includes a total of nine cells, three vertical cells by three horizontal cells as viewed in a cross section perpendicular to the filter axial direction X, and has the shape of a block with a length of 10 mm in the filter axial direction X. Note that dotted areas 102 on the end surface of the partition portion 101 illustrated in FIG. 6 indicate that the cells 11 with the dotted areas 102 are outlet cells 112, not that the partition portion 101 has the sealing section 13. Thus, the cells 11 without the dotted areas 102 on the end surface of the partition portion 101 are inlet cells 111, which receive an inflow of the exhaust gas G. The partition portion 101 has an outlet cell 112 positioned at its center.

Figure 7:
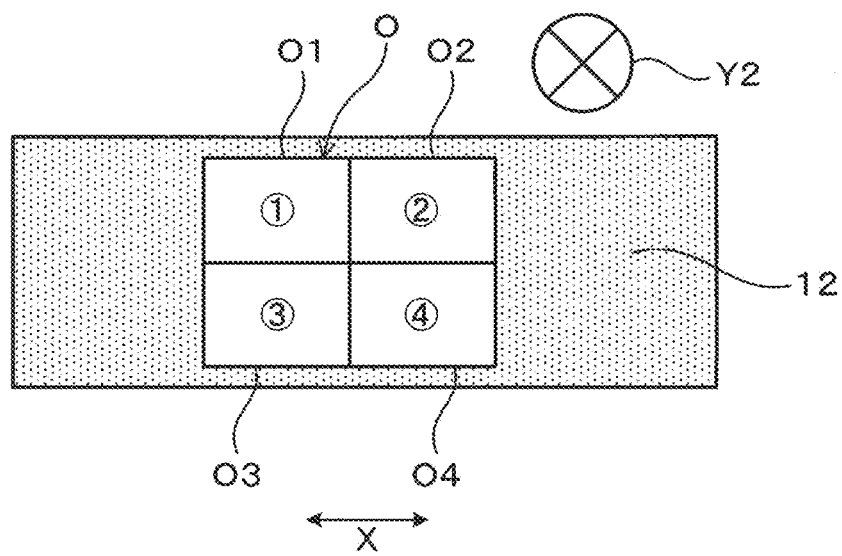
FIG. 7 is a partial view of a partition surface facing incoming exhaust gas as viewed in the direction of obser-vation, illustrating an observation area in surface roughness measurement on the partition surface.

Then, as shown in FIG. 6, the partition portion 101 is shaved down to a dotted line position P in FIG. 6 so as to allow observation of the surface of the partition 12 facing incoming exhaust gas and included in the outlet cell 112 positioned at the center of the partition portion 101. FIG. 7 is a partial view of the surface of the partition 12 facing incoming exhaust gas as viewed in the direction of observation. FIG. 6 shows an arrow Y1 indicating the direction of observation, and FIG. 7 shows a sign Y2 indicating that the arrow Y1 shown in FIG. 6 points in the direction perpendicular to the drawing and in the depth direction. Then, the shaved partition portion 101 is set in the noncontact surface roughness measurement instrument so as to allow observation of the surface of the partition 12 facing incoming exhaust gas. The noncontact surface roughness measurement instrument may be a laser depth microscope, OLS4100, manufactured by Olympus Corporation. In the case where the laser depth microscope, OLS4100, is unavailable due to discontinuance or other reasons, the microscope may be replaced with a successor that can perform surface roughness measurement based on the same analysis principle, such as an OLS5000, manufactured by Olympus Corporation.

Then, the noncontact surface roughness measurement instrument is used to perform surface roughness measurement on the surface of the partition 12 facing incoming exhaust gas. The surface roughness measurement is performed under the conditions: a magnification of 50×, a laser wavelength of 405 nm, a scan rate corresponding to "High-precision Mode" of the measurement instrument, and an observation field formed of four continuous fields each having a 700-μm side extending in the lateral direction equal to the filter axial direction X and a 500-μm side extending in the vertical direction orthogonal to the filter axial direction X. As shown in FIG. 7, an observation area O for the surface roughness measurement on the surface of the partition 12 includes four continuous fields O1, O2, O3, and O4.

Then, analysis software in the noncontact surface roughness measurement instrument is used to read and combine the images of the four fields O1 to O4 with each other. The resultant composite image is then analyzed with height and depth information noise removed. The height information is then represented on a color scale to produce a three-dimensional image of the irregularities of the partition surface facing incoming exhaust gas. Then, the three-dimensional image of the irregularities after the above preprocessing is subjected to "Surface Roughness Measurement" of the analysis software to determine the volumes Vvv and Vmp in the partition portion 101.

The sum of the Vvv average and the Vmp average determined as described above from each of the partition portions 101 at three positions taken from the exhaust gas purification filter 1 is defined as the total value of the void volume of the reduced dale 123, Vvv, and the material volume of the reduced hill 124, Vmp, of the surface of the partition 12 determined in the noncontact surface roughness measurement.

Figure 8A:
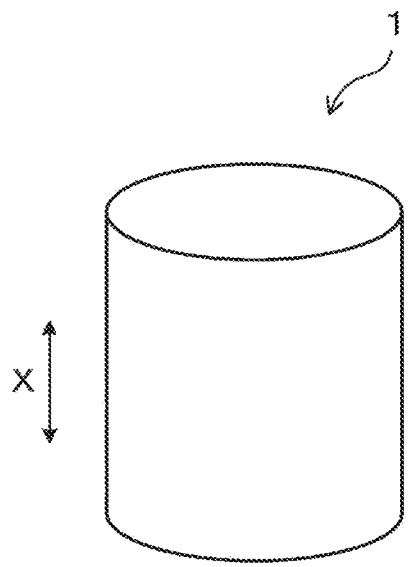
FIG. 8A schematically illustrates an example exterior shape of the exhaust gas purification filter according to the first embodiment, FIG. 8B schematically illustrates a radial position in the exhaust gas purification filter at which a partition portion is extracted for surface roughness measurement on the partition surface (specifically, a cross-sectional view taken in the direction of line VIIIb-VIIIb indicated by arrows in FIG. 8C), and FIG. 8C schematically illustrates filter axial and radial positions in the exhaust gas purification filter at which partition portions are extracted (specifically, a cross-sectional view taken in the direction of line VIIIc-VIIIc indicated by arrows in FIG. 8B)
Figure 8B:
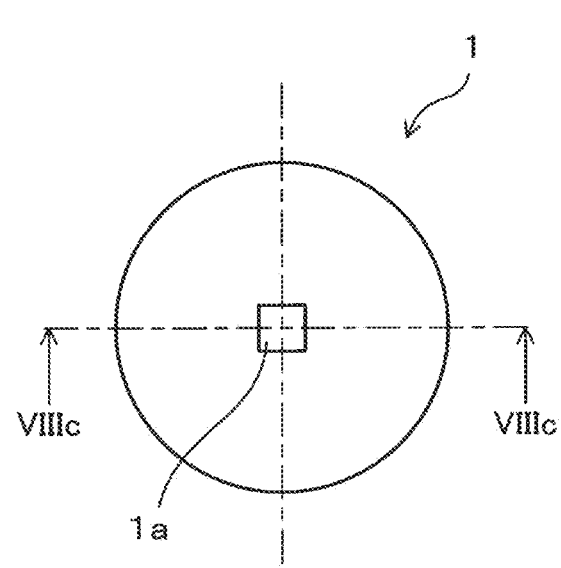
Figure 8C:
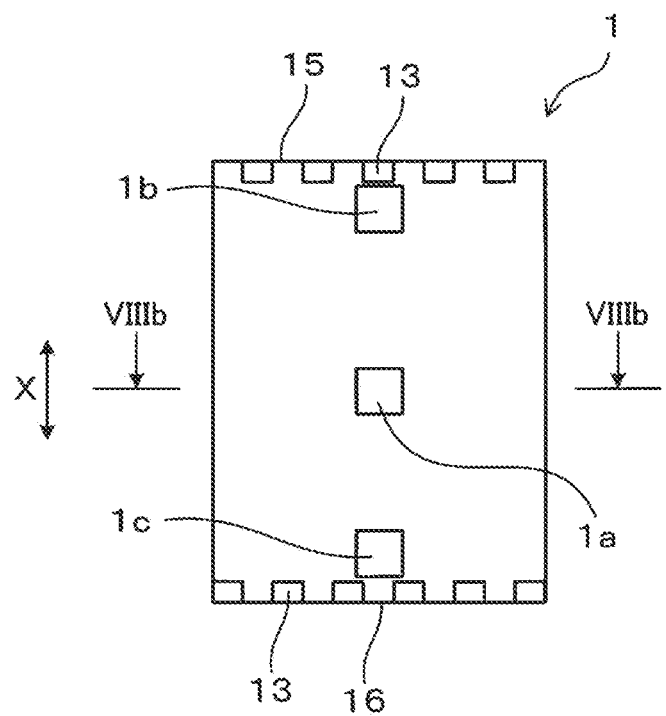

More specifically, the partition portions 101 are extracted, as shown in FIG. 8, from three positions: a central portion 1a, an upstream portion 1b near the sealing section 13 in the inlet end surface 15, and a downstream portion 1c near the sealing section 13 in the outlet end surface 16 that are aligned in the filter axial direction X through the center of the diameter of the exhaust gas purification filter 1. The reason that a partition portion 101 is extracted from the center of the exhaust gas purification filter 1 is that this portion permits the exhaust gas G to flow fast, causing the exhaust gas G to flow through easily. The center of the diameter of the exhaust gas purification filter 1 with at least the above structure allows the NOx conversion efficiency to be improved sufficiently.

In the exhaust gas purification filter 1, the partition 12 has a mean pore size of 12 μm or more and 20 μm or less. The partition 12 has a porosity of 50% or more and 75% or less.

The mean pore size and the porosity of the partition 12 are measured with a mercury porosimeter based on the principle of mercury porosimetry. More specifically, a test piece is cut out from the exhaust gas purification filter 1. Note that the part with the sealing section 13 formed on it is excluded. The test piece is a rectangular solid with dimensions of 15 mm by 15 mm in a plane orthogonal to the filter axial direction X and with a length of 20 mm in the filter axial direction X. Then, the test piece is placed in the measurement cell of the mercury porosimeter, and the measurement cell is depressurized. After that, the measurement cell is charged with mercury and pressurized. Based on the applied pressure and the volume of the mercury contained in the pores in the partition 12 included in the test piece, the pore size and the pore volume are measured. The measurement is performed at a pressure ranging from 0.5 to 20,000 psia. It is noted that 0.5 psia corresponds to $0.35 \times 10^3$ kg/mm$^2$, and 20,000 psia corresponds to 14 kg/mm$^2$. The pore size range corresponding to this pressure range is 0.01 to 420 μm. The pore size is calculated from a pressure using constants that are a contact angle of 140° and a surface tension of 480 dyn/cm. The mean pore size of the partition 12 is the pore size at which the cumulative pore volume from the smallest pore size in the pore size distribution of the partition 12 reaches 50% (the pore size at the 50% cumulative pore volume). The porosity of the partition 12 can be calculated from the following relational expression:

Porosity (%) of partition 12=Total pore volume/(Total pore volume+1/True specific gravity of partition material)×100.

For cordierite as a partition material, the true specific gravity of the cordierite may be 2.52.

The exhaust gas purification filter 1 has the surface of the partition 12 with the total value of the void volume of the reduced dale 123, Vvv, and the material volume of the reduced hill 124, Vmp, the mean pore size of the partition 12, and the porosity of the partition 12 within the above specific ranges, thus enabling a higher initial NOx conversion rate to be achieved while maintaining the initial PM collection efficiency and reducing the initial pressure drop, without increasing the amount of catalyst. The mechanism that achieves the effects will now be described with reference to FIGS. 9 to 11.

Figure 9A:
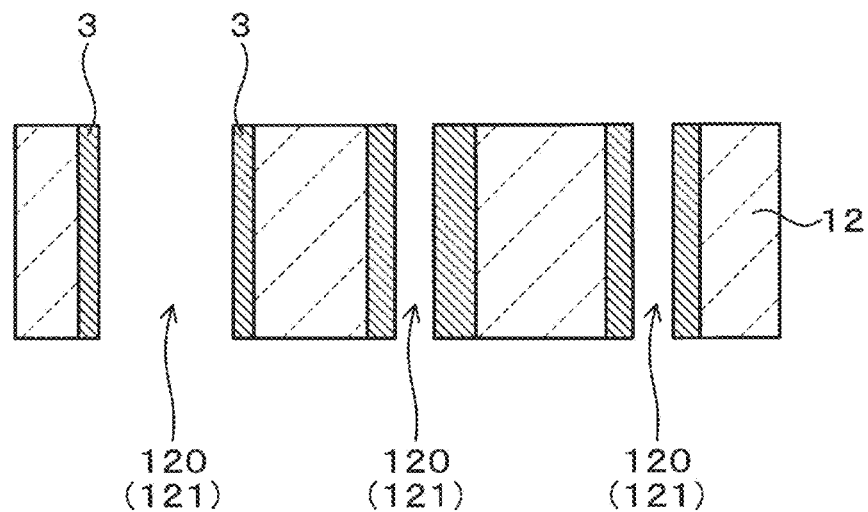
FIG. 9A schematically illustrates a state in which the pore wall surfaces of pores in a partition are coated with catalyst layers without blocking the pores, and FIG. 9B schematically illustrates a state in which a simple increase in the amount of catalyst for the partition in FIG. 9A causes the pores to be blocked by the catalyst.
Figure 9B:
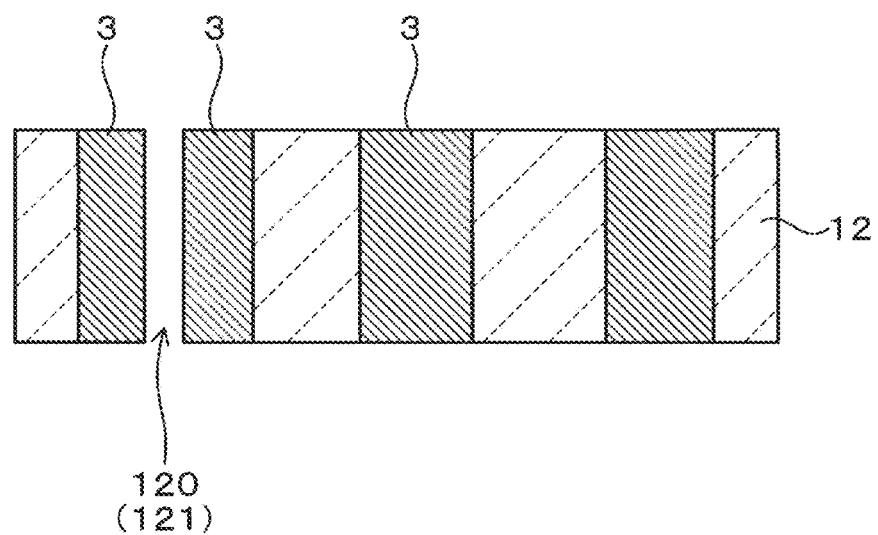

As shown in FIG. 9A, assume that the pores 120 in the partition 12, or specifically, the surfaces of the communication channels 121, are coated with catalyst layers 3 without blocking the communication channels 121. In this state, if the amount of catalyst is simply increased so as to improve the NOx conversion efficiency, as shown in FIG. 9B, the communication channels 121 in the partition 12 will be blocked by the catalyst. As a result, the exhaust gas purification filter 1 in which the exhaust gas G passes through the partition 12 will cause the PM collection efficiency to decrease and the pressure drop to increase at the early phase. Thus, it is important to improve the NOx conversion efficiency in the exhaust gas purification filter 1 without increasing the amount of catalyst. Of course, the initial PM collection efficiency is to be maintained while the initial pressure drop is to be reduced.

Figure 10A:
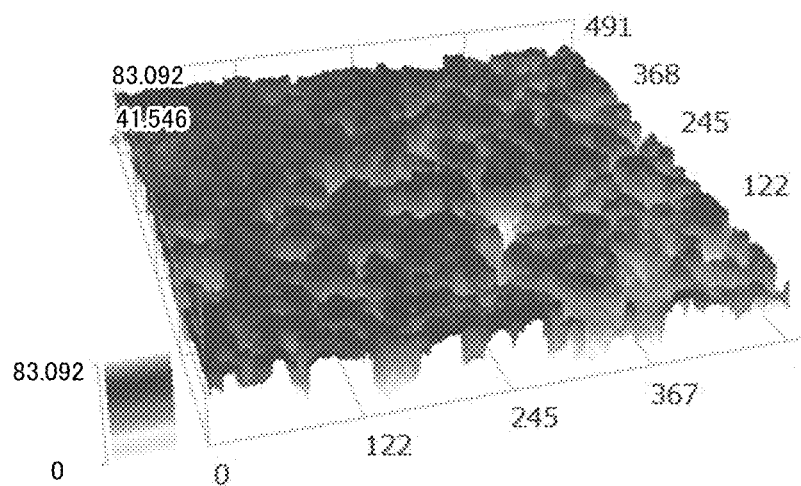
FIG. 10A is an example three-dimensional image of the irregularities of a partition surface facing incoming exhaust gas with the total value of the volumes Vvv and Vmp being within a range according to the present disclosure.
Figure 10B:
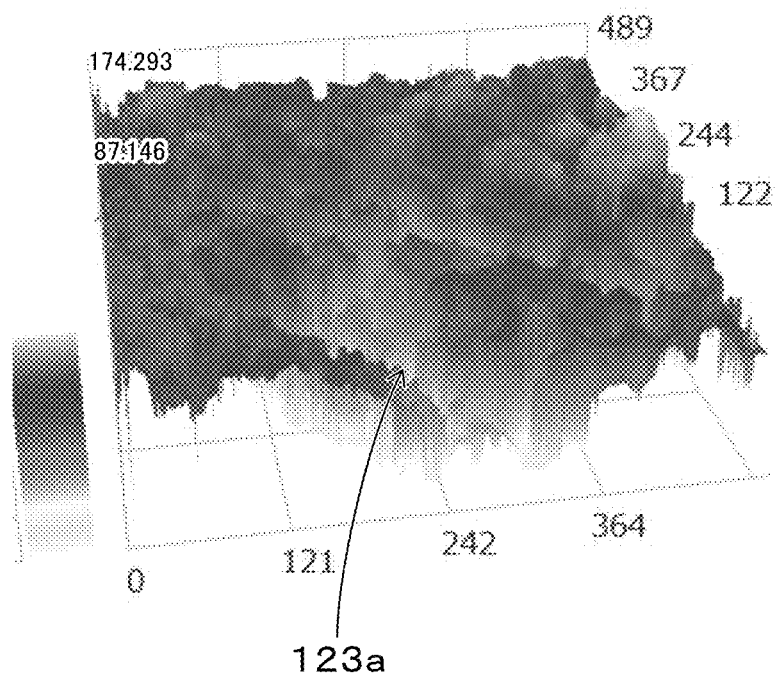
FIG. 10B is an example three-dimensional image of the irregularities of a partition surface facing incoming exhaust gas with the total value of the volumes Vvv and Vmp being out of the range according to the present disclosure.

For the exhaust gas purification filter 1 in which the total value of the volumes Vvv and Vmp of the surface of the partition 12 is within the above specific range, as illustrated in FIG. 10A, the surface of the partition 12 has small irregularities (the surface of the partition 12 is flat), and thus the exhaust gas G easily disperses into each pore 120. This regulates the flow rate of the exhaust gas G flowing in the partition 12, reducing unreacted exhaust gas G that flows through the partition 12 without being reacted sufficiently with the catalyst. In other words, the flow rate of the exhaust gas G flowing in the partition 12 is regulated to ensure a sufficient time for reaction between the exhaust gas G and the catalyst, enabling the catalyst to be utilized effectively in each pore 120. This allows the early NOx conversion efficiency to be improved without increasing the amount of catalyst. In contrast, if the total value of the volumes Vvv and Vmp of the surface of the partition 12 is out of the above specific range, as illustrated in FIG. 10B, the surface of the partition 12 has quite large irregularities, and accordingly the exhaust gas G flows intensively in extremely deep recesses 123a and has a higher flow rate. As a result, unreacted exhaust gas G is likely to flow easily through the partition 12. Thus, in this case, the initial NOx conversion rate cannot be improved.

Figure 11A:
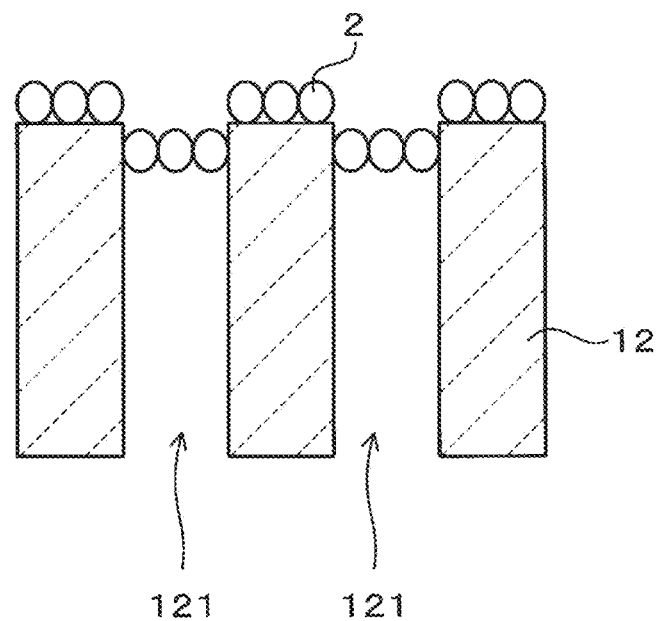
FIG. 11A illustrates a partition surface with small irregularities less likely to cause uneven PM accumulation.
Figure 11B:
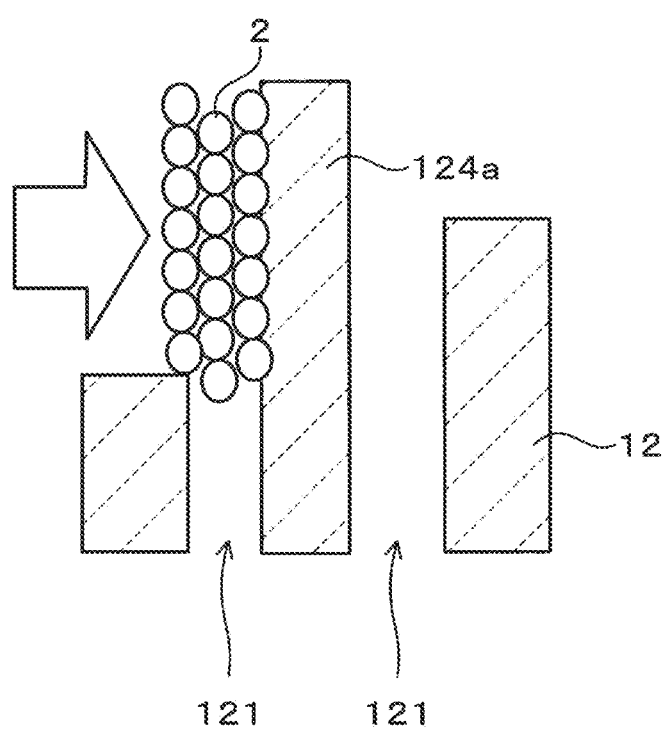
FIG. 11B illustrates a partition surface with large irregularities likely to cause uneven PM accumulation due to an extremely high projection protruding as a solid barrier.

With the total value of the volumes Vvv and Vmp of the surface of the partition 12 within the above specific range, as illustrated in FIG. 11A, the surface of the partition 12 has small irregularities, which are less likely to cause uneven accumulation of collected PM 2. This can prevent a localized temperature increase in the partition 12 during regeneration for the PM 2. Accordingly, the use of the exhaust gas purification filter 1 is less likely to cause localized thermal degradation in the catalyst, and the NOx conversion efficiency after endurance can also be improved. In contrast, with the total value of the volumes Vvv and Vmp of the surface of the partition 12 out of the above specific range, as illustrated in FIG. 11B, the surface of the partition 12 has quite large irregularities, and thus extremely large projections 124a protrude and act as a solid barrier, increasing the likelihood of the PM 2 accumulating. As a result, the use of the exhaust gas purification filter 1 is likely to promote localized thermal degradation in the catalyst, and it is challenging to improve the NOx conversion efficiency after endurance.

In WO2009/141883 A, which is mentioned above, the line roughness measurement defined in JIS B 0601 is used to determine the arithmetic average roughness Ra of the partition surface, and the NOx conversion efficiency is improved by raising the roughness Ra of the partition surface to increase the area of contact with exhaust gas. In other words, WO2009/141883 A, which is mentioned above, does not describe or suggest any technical idea of improving the NOx conversion efficiency based on the above mechanism by reducing the irregularities of the surface of the partition 12, especially determining the total value of the volumes Vvv and Vmp of the surface of the partition 12 within the above specific range.

Additionally, in the exhaust gas purification filter 1, the mean pore size and the porosity of the partition 12 are each within the above specific range. This allows the exhaust gas purification filter 1 to maintain the initial PM collection efficiency and reduce the initial pressure drop even with catalyst layers formed. If the partition 12 has a mean pore size lower than the lower limit described above, the exhaust gas G cannot easily flow through, increasing the initial pressure drop. In contrast, if the partition 12 has a mean pore size higher than the upper limit described above, the PM 2 easily slips through, reducing the initial PM collection efficiency. If the partition 12 has a porosity lower than the lower limit described above, the number of communication channels 121 decreases. As a result, the decrease in the number of sites for collecting the PM 2 causes the initial PM collection efficiency to decrease easily, and the decrease in the number of passages for the exhaust gas G causes the initial pressure drop to increase. If the partition 12 has a porosity lower than the upper limit described above, the exhaust gas purification filter 1 has an unstable strength, and the stress during a casing process or the heat generation during regeneration for the PM 2 is likely to cause a crack, reducing the structural reliability of the exhaust gas purification filter 1.

As described above, with the total value of the volumes Vvv and Vmp of the surface of the partition 12, the mean pore size of the partition 12, and the porosity of the partition 12 within the above specific ranges, the exhaust gas purification filter 1 with catalyst layers formed can achieve a higher initial NOx conversion rate while maintaining the initial PM collection efficiency and reducing the initial pressure drop, without increasing the amount of catalyst (even with the same amount of catalyst).

In order to facilitate an improvement in the NOx conversion rate by increasing the contact area between the catalyst and NOx, the total value of the volumes Vvv and Vmp in the exhaust gas purification filter 1 may be preferably 1.35 $\mu m^3/\mu m^2$ or more, and more preferably 1.4 $\mu m^3/\mu m^2$ or more. In order to improve the initial and the post-endurance NOx conversion efficiency with catalyst layers formed, the total value of the volumes Vvv and Vmp may be preferably 1.65 $\mu m^3/\mu m^2$ or less, more preferably 1.6 $\mu m^3/\mu m^2$ or less, and still more preferably 1.55 $\mu m^3/\mu m^2$ or less.

In order to more reliably reduce the initial pressure drop with catalyst layers formed, the mean pore size of the partition 12 in the exhaust gas purification filter 1 may be preferably 13 μm or more, and more preferably 14 μm or more. In order to facilitate the prevention of PM slippage and the resulting decrease in the initial PM filtration performance with catalyst layers formed, the mean pore size of the partition 12 may also be preferably 19 μm or less, more preferably 18 μm or less, and still more preferably 17 μm or less.

In order to more reliably maintain the initial PM filtration performance and reduce the initial pressure drop with catalyst layers formed, the porosity of the partition 12 in the exhaust gas purification filter 1 may be preferably 55% or more, and more preferably 60% or more. In order to easily ensure the strength of the exhaust gas purification filter 1 itself, prevent cracking caused by the stress during a casing process or the heat generation during regeneration for the PM 2, and easily ensure the structural reliability of the exhaust gas purification filter 1, the porosity of the partition 12 may be preferably 70% or less, more preferably 67% or less, and still more preferably 65% or less.

The exhaust gas purification filter 1 can exert its effects sufficiently when used in an exhaust passage for a gasoline engine, that is, as a GPF. However, the exhaust gas purification filter 1 may also be used in an exhaust passage for a diesel engine, that is, as a diesel particulate filter (DPF).

The exhaust gas purification filter 1 is used with a catalyst supported on the partition 12. The exhaust gas purification filter 1 may have a catalyst supported on the pore wall surfaces of the communication channels 121 in the partition 12 or a catalyst supported on the surface of the partition 12, or both. In other words, the catalyst layers 3 formed of stratified catalyst may be formed on the pore wall surfaces of the communication channels 121 or on the surface of the partition 12, or both. The catalyst forming the catalyst layers 3 may be NOx catalyst including noble metal such as Pt, Rh, or Pd. In this case, NOx as well as other noxious gas components such as CO and HC may be converted. The catalyst layers 3 may also contain alumina or co-catalyst in addition to the catalyst. Examples of the co-catalyst include ceria, zirconia, and a ceria-zirconia solid solution. The amount of the supported catalyst in the exhaust gas purification filter 1 may be, for example, 50 g/L or more and 150 g/L or less. Note that the total value of the volumes Vvv and Vmp, the mean pore size of the partition, and the porosity of the partition described above are the values before the exhaust gas purification filter 1 supporting the catalyst.

Second Embodiment

Figure 12:
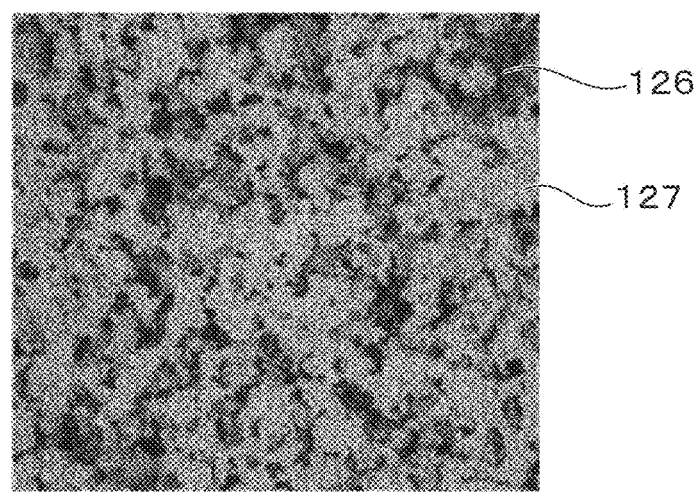
FIG. 12 is an example backscattered electron image of a partition surface in an exhaust gas purification filter according to a second embodiment, the image taken with a scanning electron microscope to measure the diameters of the surface openings of pores in the partition surface.
Figure 13:
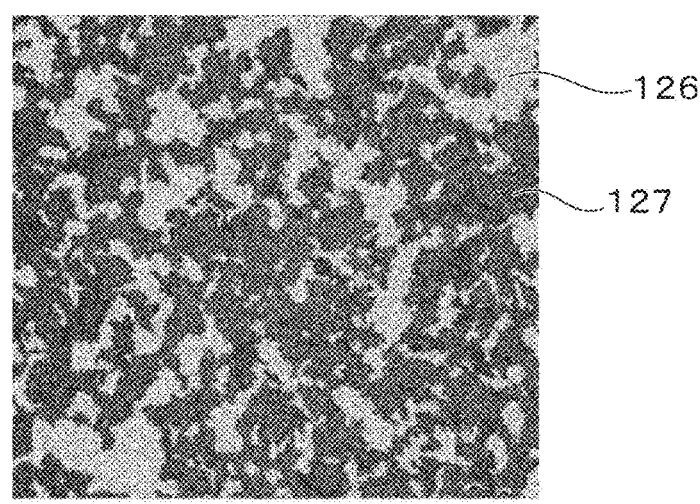
FIG. 13 is an example binarized image obtained by binarization of the backscattered electron image in FIG. 4.

An exhaust gas purification filter according to a second embodiment will now be described with reference to FIGS. 12 and 13. In the second and subsequent embodiments, the same reference signs as used in a previous embodiment indicate the same items as described in the previous embodiment, unless otherwise specified.

In the exhaust gas purification filter 1 according to the present embodiment, the ratio of the average diameter of the surface openings of the pores 120 in the surface of the partition 12 to the mean pore size of the partition 12 is 0.55 or more and 0.85 or less. Note that the above ratio of the average diameter of the surface openings of the pores 120 in the surface of the partition 12 to the mean pore size of the partition 12 is the value before the exhaust gas purification filter 1 supports the catalyst. The ratio of the average diameter of the surface openings of the pores 120 in the surface of the partition 12 to the mean pore size of the partition 12 can be lowered by reducing the diameters of the surface openings of the pores 120 in the surface of the partition 12 and increasing the mean pore size in the partition 12.

This structure allows, in catalyst coating, the surface of the partition 12 to be coated with a larger amount of catalyst, and also allows the pore wall surfaces of the communication channels 121 in the partition 12 to be coated with thinner catalyst layers 3. Accordingly, this structure facilitates the achievement of the NOx conversion effect on the surface of the partition 12 and the prevention of the clogging of the communication channels 121 with catalyst, thus enabling a higher NOx conversion efficiency to be achieved easily while maintaining the PM collection efficiency and reducing the pressure drop. If the ratio of the average diameter of the surface openings of the pores 120 in the surface of the partition 12 to the mean pore size of the partition 12 is lower than the lower limit defined above, the catalyst layers 3 are more likely to be formed merely on the surface of the partition 12 (the catalyst layers 3 are less likely to be formed on the pore wall surfaces of the communication channels 121 in the partition 12), resulting in the catalyst layers 3 on the surface of the partition 12 having a greater coating thickness. The catalyst layers 3 formed on the surface of the partition 12 with a greater coating thickness have an area into which no exhaust gas G diffuses. Thus, a larger amount of catalyst does not contribute to NOx conversion, exhibiting a tendency to reduce the NOx conversion efficiency. If the ratio of the average diameter of the surface openings of the pores 120 in the surface of the partition 12 to the mean pore size of the partition 12 is higher than the upper limit defined above, the catalyst layers 3 are not formed on the surface of the partition 12, and most catalyst is supported in the partition 12. As a result, a larger number of communication channels 121 are blocked by the catalyst, exhibiting a tendency to reduce the PM collection efficiency, the pressure drop, and the NOx conversion efficiency.

The average diameter of the surface openings of the pores 120 in the surface of the partition 12 is measured in the manner described below. In the surface of the partition 12 facing incoming exhaust gas G and the surface of the partition 12 facing outgoing exhaust gas G, the pores 120 form surface openings 126. In this example, a scanning electron microscope (SEM) is used to obtain a backscattered electron image of the surface of the partition 12 facing incoming exhaust gas G (i.e., the surface of the partition 12 facing the inlet cell 111 described above). Of the surface of the partition 12, the part with the sealing section 13 formed on it is excluded. This imaging may use an accelerating voltage of 10 kV and a magnification of 300×. FIG. 12 shows an example backscattered electron image of the surface of the partition 12. The backscattered electron image of FIG. 12 has black areas indicating the surface openings 126 in the surface of the partition 12, and a light gray area indicating a skeleton part skeleton part 127 in the surface of the partition 12. Then, the captured image is binarized using image analysis software (WinROOF, manufactured by MITANI CORPORATION). The binarization is performed to differentiate between the surface openings 126 in the surface of the partition 12 and the skeleton part 127 in the surface of the partition 12. Since the surface openings 126 and the skeleton part 127 differ from each other in luminance, noise left in the captured image is eliminated, and any threshold is set before the binarization. Different captured images have different thresholds, and thus a threshold for separating the surface openings 126 from the skeleton part 127 is set for each captured image while the captured image is being viewed. FIG. 13 shows an example binarized image. The binarized image in FIG. 13 has light gray areas indicating the surface openings 126 in the surface of the partition 12, and a black area indicating the skeleton part 127 in the surface of the partition 12. For the surface openings 126 in the resultant binarized image, the equivalent circular diameter that is the diameter of the perfect circle having the same area of a surface opening 126 is calculated for each of the surface openings 126. All of the calculated equivalent circular diameters are added, and the resultant value is divided by the number of surface openings 126 to give the surface opening diameter. The average of the surface opening diameters calculated as described above from binarized images obtained for any five different areas on the surface of the partition 12 is determined as the average diameter of the surface openings of the pores 120 in the surface of the partition 12. Then, the average diameter of the surface openings of the pores 120 in the surface of the partition 12 can be divided by the mean pore size of the partition 12 to determine the ratio of the average diameter of the surface openings of the pores 120 in the surface of the partition 12 to the mean pore size of the partition 12. In other words, the ratio of the average diameter of the surface openings of the pores 120 in the surface of the partition 12 to the mean pore size of the partition 12 can be determined from the formula: (the average diameter of the surface openings of the pores 120 in the surface of the partition 12)/(the mean pore size of the partition 12).

In order to improve the NOx conversion efficiency, the ratio of the average diameter of the surface openings of the pores 120 in the surface of the partition 12 to the mean pore size of the partition 12 may be preferably 0.55 or more, more preferably 0.60 or more, and still more preferably 0.65 or more. In order to improve the NOx conversion efficiency, the ratio of the average diameter of the surface openings of the pores 120 in the surface of the partition 12 to the mean pore size of the partition 12 may be preferably 0.85 or less, more preferably 0.80 or less, and still more preferably 0.75 or less. The other configuration and functional effects are the same as in the first embodiment.

Third Embodiment

Figure 14:
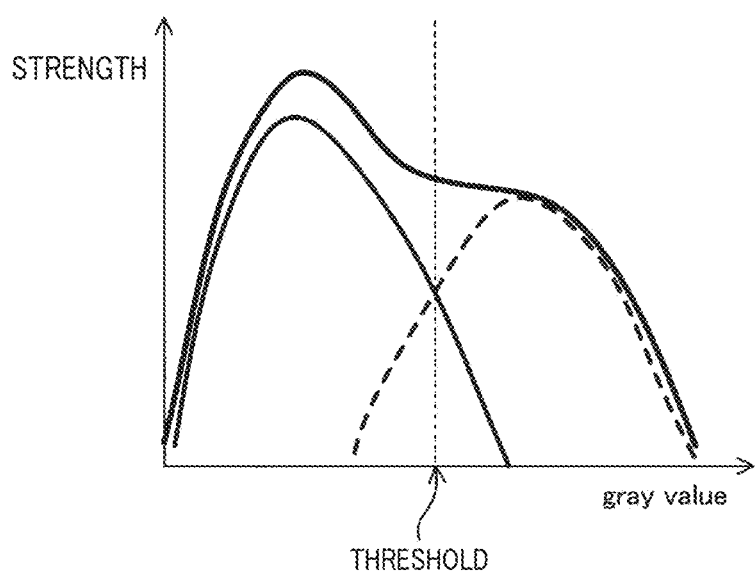
FIG. 14 is an example gray value plot used to measure the number of communication channels in a partition in an exhaust gas purification filter according to a third embodiment.
Figure 15:
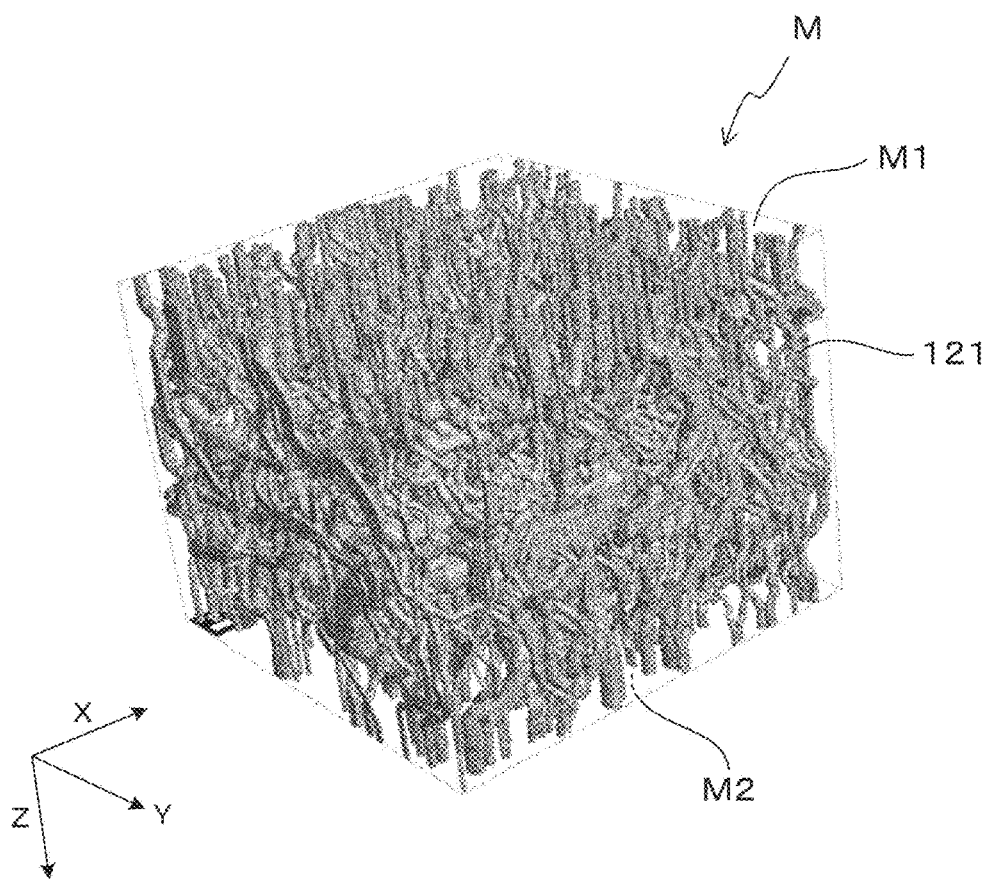
FIG. 15 illustrates an example of communication channels in a partition structure model obtained to measure the number of communication channels in the partition.

An exhaust gas purification filter according to a third embodiment will now be described with reference to FIGS. 14 and 15. In the exhaust gas purification filter 1 according to the present embodiment, the partition 12 has communication channels 121 that allow communication between adjacent cells 11 as in the above embodiments. The communication channel count that is the number of communication channels 121 per square millimeter of the partition 12 is 3,800 or more and 6,000 or less. Note that the communication channel count described above is the value before the exhaust gas purification filter 1 has the catalyst supported thereon.

In this structure, the increase in the number of communication channels 121 regulates the flow rate of exhaust gas G flowing in the partition 12 to increase the likelihood of ensuring enough time for reaction between the exhaust gas G and the catalyst. Furthermore, the increase in the number of communication channels 121 reduces the possibility that the communication channels 121 are blocked by catalyst when the catalyst is supported. The catalyst that blocks the communication channels 121 does not contribute to NOx conversion. Accordingly, the structure facilitates an improvement in the NOx conversion efficiency. However, too high a communication channel count would increase the area of catalyst supported on the pore wall surfaces of the communication channels 121, resulting in thinner catalyst layers 3. This makes it challenging to ensure enough time for reaction between the exhaust gas G and the catalyst, and increases the likelihood that unreacted exhaust gas G would slip through the communication channels 121 to reduce the NOx conversion efficiency. Thus, the communication channel count may be 6,000 or less.

The communication channel count per square millimeter of the partition 12 is calculated from a partition structure model obtained by transforming tomograms of the partition 12 taken by an X-ray CT apparatus into a three-dimensional image. The communication channel count per square millimeter of the partition 12 is measured as detailed below.

A partition piece is cut out from the exhaust gas purification filter 1. Note that the part with the sealing section 13 formed on it is excluded. The partition piece is a rectangular solid with a length of about 700 μm in the filter axial direction X, a width of about 700 μm in the direction of the surface of the partition 12 orthogonal to the filter axial direction X, and a thickness equal to the partition thickness. Then, the partition piece is embedded in resin while being degassed in a vacuum to provide an X-ray CT imaging sample. As to the sample, the X-ray CT apparatus is used to take serial tomographic images under the imaging conditions: a voltage of 80 kV, a step of 0.1°, and a resolution of 0.684787 μm/pixel. The resultant serial tomographic images in the TIFF format are read with 0.6874787 μm/voxel using the import Geo-Vol function, or an interface of GeoDict, which is microstructure simulation software developed by Math2Market GmbH. Then, to separate the skeleton part and the space in the read images, the partition piece is represented as a three-dimensional model with a threshold that is the intersection of two separate hills in a gray value plot as shown in FIG. 14. Then, the noise in the three-dimensional model is removed, and an unnecessary part is also removed so as to provide a shape of 600 voxels×600 voxels × partition-thickness voxels. Then, the number of communication channels 121 in the three-dimensional partition structure model M is determined using Percolation Path included in the functions of Porodict, which is one GeoDict module. For details of the calculation method used by Percolation Path in GeoDict, reference may be made to the description of the GeoDict manual. FIG. 15 illustrates an example of communication channels in the partition structure model. The partition structure model M shown in FIG. 15 has a top surface M1 representing the surface of the partition 12 facing incoming exhaust gas, and a back surface M2 representing the surface of the partition 12 facing outgoing exhaust gas. After the determination, the determined communication channel count is converted into the communication channel count per square millimeter of the surface of the partition 12 facing incoming exhaust gas (the top surface M1). The above measurement is performed for partition pieces cut out from six positions, and the average of the resultant values after the conversion from the obtained communication channel counts is determined as the communication channel count per square millimeter of the partition. More specifically, the partition pieces are extracted from six positions: a central portion, an upstream portion near the sealing section 13 in the filter end surface 15, and a downstream portion near the sealing section 13 in the filter end surface 16 in the filter axial direction X through the center of the diameter of the exhaust gas purification filter 1; and a central portion, an upstream portion near the sealing section 13 in the filter end surface 15, and a downstream portion near the sealing section 13 in the filter end surface 16 in the filter axial direction X along the outer periphery of the exhaust gas purification filter 1.

In order to improve the NOx conversion efficiency, the communication channel count per square millimeter of the partition 12 may be preferably 3,900 or more, more preferably 4,000 or more, still more preferably 4,100 or more, and yet still more preferably 4,200 or more. In order to improve the NOx conversion efficiency, the communication channel count per square millimeter of the partition 12 may be preferably 5,900 or less, more preferably 5,800 or less, still more preferably 5,700 or less, and yet still more preferably 5,600 or less. The other configuration and functional effects are the same as in the first embodiment. The present embodiment may also be applicable to the second embodiment.

Fourth Embodiment

A method of producing an exhaust gas purification filter according to a fourth embodiment will now be described. The method of producing an exhaust gas purification filter according to the fourth embodiment is a method for producing the above exhaust gas purification filters according to the first to the third embodiments. The method will be described in detail below.

To produce the exhaust gas purification filter 1, a raw material powder for ceramic used to form the partition 12, a binder, a solvent, a pore-forming material added as appropriate, and additives such as a dispersant and a lubricant are mixed to prepare a body. The raw material powder for ceramic used to form the partition 12 may be selected as appropriate in accordance with the ceramic for forming the partition 12. For example, if the ceramic for forming the partition 12 is cordierite, the raw material powder for ceramic may contain a magnesium source such as magnesia, an aluminum source such as alumina or aluminum hydroxide, and a silicon source such as silica. If the ceramic for forming the partition 12 is aluminum titanate, the raw material powder for ceramic may contain a titanium source such as titania and an aluminum source such as alumina. If the ceramic for forming the partition 12 is silicon carbide, the raw material powder for ceramic may contain a carbon source and a silicon source. The contents of the components may be adjusted as appropriate so as to provide desired ceramic. In the present embodiment, the method of producing the exhaust gas purification filter 1 will be described in detail with reference to an example in which the partition 12 of the exhaust gas purification filter 1 is formed from cordierite.

First, a body containing cordierite-forming raw materials is prepared. The body can be prepared by putting silica, talc, and aluminum hydroxide together in a manner to attain cordierite composition, and further adding and mixing a binder such as methylcellulose, a pore-forming material such as graphite, a dispersant such as an anionic dispersant or a cationic dispersant, lubricating oil, and water as appropriate. So as to attain cordierite composition, alumina and kaolin may be blended. The silica may be porous silica. In the cordierite-forming raw materials, the silica and the talc may serve as pore-forming raw materials. The pore-forming raw materials are materials for forming the pores 120. When calcined, the pore-forming raw materials generate liquid-phase components, which form the pores 120. In the cordierite-forming raw materials, the aluminum hydroxide, the alumina, and the kaolin may serve as raw materials for aggregate. The raw materials for aggregate are materials for forming the ceramic part other than the pores 120.

Then, the prepared body is forced through a die to extrude a honeycomb extrudate. The honeycomb extrudate is then dried and fired. As a result, the honeycomb structure is formed. The honeycomb structure is a portion including the cells 11, the partition 12, and the skin 14. The sealing section 13 may be formed before or after the honeycomb structure is fired. More specifically, for example, seal-forming slurry may be used to alternately seal the openings of the cells 11 in the honeycomb structure after the firing or the honeycomb extrudate before the firing, and the slurry may be fired to form the sealing section 13.

The total value of the void volume of the reduced dale 123, Vvv, and the material volume of the reduced hill 124, Vmp, in the surface of the partition 12 may be controlled to the above-described desired range by, for example, adjusting the maximum height roughness Rz (defined in JIS B0601-2001) of the slit surface of the die used to extrude the honeycomb extrudate. The slit is a section through which the body passes to shape the part serving as the partition 12. The mean pore size and the porosity of the partition 12 may also be controlled to the above-described desired ranges by, for example, adjusting the particle diameter d50 of the pore-forming raw materials and the content of the pore-forming raw materials. The above particle diameter d50 can be obtained based on the particle size distribution on the volumetric basis determined by a laser diffraction particle size analyzer (the same holds true for the following, and will not be described redundantly).

The diameters of the surface openings of the pores in the surface of the partition 12 may be controlled to the above-described desired range by, for example, adjusting the maximum height roughness Rz (defined in JIS B0601-2001) of the slit surface of the die.

The communication channel count per square millimeter of the partition 12 may also be controlled to the above-described desired range by, for example, promoting contact between the pore-forming raw materials in the body. This is because pore-forming raw materials in contact with each other during a liquid-phase reaction will improve the communication property of the pores 120 due to the fact that the pore-forming raw materials diffuse to make the pores 120. To selectively bring pore-forming raw materials into contact with each other in the body, for example, dispersants such as anionic dispersants and cationic dispersants may be used in the preparation of the body. Examples of the anionic dispersants include Nopcosperse 44-C (manufactured by Sanyo Chemical Industries, Ltd.), whereas examples of the cationic dispersants include Nopcosperse 092 (manufactured by Sanyo Chemical Industries, Ltd.).

More specifically, a predetermined content of pore-forming raw materials (in this example, a mixed powder of silica and talc) is divided into two halves. To provide one half of the pore-forming raw materials with negative electric charges, the half of the pore-forming raw materials, an anionic dispersant, and water are premixed to give a first mixture. The first mixture has the anionic dispersant attached to the half of the pore-forming raw materials. To provide the other half of the pore-forming raw materials with positive electric charges, the latter half of the pore-forming raw materials, a cationic dispersant, and water are premixed to give a second mixture. The second mixture has the cationic dispersant attached to the latter half of the pore-forming raw materials. Then, the first mixture, the second mixture, the raw materials for aggregate, and other raw materials added as appropriate are further mixed. In this manner, the body is produced with the pore-forming raw materials in contact with each other. The communication channel count of the partition 12 may be controlled to the above-described desired range by, for example, modifying the types of dispersants, the contents of the dispersants, the premixing time for mixing the pore-forming raw materials and the dispersants, the revolution speed for the extrusion, and the time for drying the body. However, too long a premixing time for mixing the pore-forming raw materials and the dispersants may cause the formation of the communication channels 121 to be unsuccessful, and thus it is preferable to adjust the premixing time appropriately. Furthermore, too large a particle diameter of raw materials for aggregate surrounding the pore-forming raw materials may cause the formation of the communication channels 121 to be unsuccessful, and thus it is also preferable to adjust the particle diameter ratio between the pore-forming raw materials and the raw materials for aggregate.

The partition 12 may be coated with the catalyst by a known method such as a method for impregnating the partition 12 with a fluid including a catalyst such as noble metal, and burning the impregnated partition. Examples of the above fluid may include a liquid such as catalyst slurry.

Experimental Example

Production of Exhaust Gas Purification Filter

In the present experimental example, the above method of producing the exhaust gas purification filters was used to produce samples 1 to 8, which were cordierite exhaust gas purification filters shown in Table 1, described later.

More specifically, porous silica, talc, and aluminum hydroxide were prepared as cordierite-forming raw materials. The porous silica and the talc are pore-forming raw materials, and the aluminum hydroxide is a raw material for aggregate.

Then, a mixed powder of the porous silica and the talc was divided into two halves. One half of the mixed powder was mixed with an anionic dispersant and water, whereas the other half of the mixed powder was mixed with a cationic dispersant and water. In this manner, a first slurry mixture containing pore-forming raw materials provided with negative electric charges, and a second slurry mixture containing pore-forming raw materials provided with positive electric charges were obtained. The amount of the anionic dispersant contained in the first mixture was 2 to 15 wt % with respect to the total amount of the porous silica and the talc, which was taken as 100 wt %, and the amount of the water contained was half the amount needed to prepare a body. The anionic dispersant used was Nopcosperse 44-C, manufactured by Sanyo Chemical Industries, Ltd. The amount of the cationic dispersant contained in the second mixture was 2 to 15 wt % with respect to the total amount of the porous silica and the talc, which was taken as 100 wt %. The amount of the water contained was half the amount needed to prepare the body. The cationic dispersant used was Nopcosperse 092, manufactured by Sanyo Chemical Industries, Ltd.

Then, the first mixture, the second mixture, the aluminum hydroxide, a dispersant, and lubricating oil were further mixed. In this manner, the body was prepared. The dispersant used was polyoxyethylene polyoxypropylene glyceryl ether having an average molecular weight of 4,550.

Then, the body was forced through a die, and the resultant honeycomb extrudate was fired at 1,410° C., a sealing section was then formed. As a result, an exhaust gas purification filter was obtained.

In the present experimental example, the maximum height roughness Rz of the slit surface of the die used for the extrusion was adjusted within the range of 1 to 15 μm to reduce the partition surface irregularities and adjust the total value of the void volume Vvv of the reduced dale and the material volume Vmp of the reduced peak of the partition surface to the above-described desired range. The roughness Rz of the slit surface of the die was adjusted by pouring an abrasive. In addition, the particle diameter d50 of the mixed powder of the porous silica and the talc (i.e., the pore forming material) was changed within the range of 5 to 35 μm to adjust the mean pore size of the partition to the above-described desired range. With the mean pore size of the partition taken into account, the maximum height roughness Rz of the slit surface of the die was adjusted within the range of 5 to 10 μm to change the diameters of the surface openings of the pores in the surface of the partition 12 and adjust the ratio of the average diameter of the surface openings of the pores in the partition surface to the mean pore size of the partition to the above-described desired range. If the slit surface of the die has a roughness Rz of 5 μm or less, the above ratio can be easily controlled to less than 0.55. In contrast, if the slit surface of the die has a roughness Rz of 10 μm or more, the above ratio can be easily controlled to more than 0.85. In addition, the amount of the mixed powder of the porous silica and the talc was changed within the range of 40 to 70% of the total amount of the raw materials to adjust the porosity of the partition to the above-described desired range. The content of each of the cationic dispersant and the anionic dispersant was changed within the range of 2 to 15 wt %, and also the time for premixing the first mixture and the second mixture and the time for mixing the body were each changed within the range of 5 to 150 minutes to adjust the communication channel count to the above-described desired range. In the present experimental example, these adjustments were combined to give the exhaust gas purification filters of samples 1 to 8, which are listed in Table 1.

Then, for comparison, samples 1C to 8C were prepared, which were cordierite exhaust gas purification filters shown in Table 1, described later. More specifically, the exhaust gas purification filters of samples 1C and 2C were obtained in the same manner as the preparation of sample 1 except that the slit surface of the die had a roughness Rz of less than 1 μm. Additionally, the exhaust gas purification filters of samples 3C and 4C were obtained in the same manner as the preparation of sample 1 except that the slit surface of the die had a roughness Rz of more than 15 μm. Additionally, the exhaust gas purification filters of samples 3C and 4C were obtained in the same manner as the preparation of sample 1 except that the slit surface of the die had a roughness Rz of more than 15 μm. Additionally, the exhaust gas purification filter of sample 5C was obtained in the same manner as the preparation of sample 1 except that the silica had a larger particle diameter. Additionally, the exhaust gas purification filter of sample 6C was obtained in the same manner as the preparation of sample 1 except that the silica had a smaller particle diameter. The exhaust gas purification filters of samples 7C and 8C were obtained in the same manner as the preparation of sample 1 except that the silica content was reduced.

In the present experimental example, the exhaust gas purification filter of each sample has dimensions of φ118.4 mm (filter diameter)×L120 mm (filter length), with a cell structure having a partition thickness of 8.5 mil and a cell count of 300 cpsi.

Measurement of Partition Characteristics

The exhaust gas purification filter of each sample with no catalyst layers formed on the partition was subjected to noncontact surface roughness measurement on the partition surface facing incoming exhaust gas in accordance with the above measurement method to calculate the total value of the void volume Vvv of the reduced dale and the material volume Vmp of the reduced peak of the partition surface. The noncontact surface roughness measurement was performed using a laser depth microscope (noncontact surface roughness measurement instrument), OLS4100, manufactured by Olympus Corporation. The combination of the four field images by the analysis software of the OLS4100 was performed by "Image Stitching" in "Data Processing." In the image stitching, "Overlap Width" was set at 3%, and "Correct Boundary between Images" and "Equalize Brightness of Luminance Image" were selected. For noise removal from the height and depth information on the combined images, the luminance threshold for removal was set at "Determine Automatically," and the area for removal was set at "Overall Area."

For each of the samples, the porosity and the mean pore size of the partition were measured in accordance with the above measurement method. The mercury porosimeter used was an AutoPore IV9500, manufactured by Shimadzu Corporation. Furthermore, for each of the samples, the diameters of the surface openings of the pores in the partition surface, and the ratio (B/A) of average diameter B of the surface openings of the pores in the partition surface to mean pore size A of the partition were measured in accordance with the above measurement method. The SEM used was a Quanta 250 FEG, manufactured by FEI Company. The image analysis software used was WinROOF Ver. 7.4, manufactured by MITANI CORPORATION. In addition, for each of the samples, the communication channel count per square millimeter of the partition was measured in accordance with the above measurement method. The X-ray CT apparatus used was a Versa XRM-500, manufactured by Xradia, Inc. The microstructure simulation software used was GeoDict 2017, sold by SCSK Corporation.

Formation of Catalyst Layers

A technique for supporting a catalyst by impregnating an exhaust gas purification filter with slurry containing catalyst components and exerting suction on the exhaust gas purification filter was used to form, on the partition of each sample, catalyst layers containing noble metal effective for NOx conversion, such as Pd, Rh, or Pt. In the present experimental example, the amount of the catalyst supported on the partition was in the range of 50 g/L to 65 g/L. Subsequently, for each sample with catalyst layers formed on its partition, the initial PM collection efficiency and the initial pressure drop were measured, and also the initial NOx conversion rate and the NOx conversion rate after endurance were measured.

Measurement of Initial PM Collection Efficiency and Initial Pressure Drop (Initial PM Collection Efficiency)

Figure 16:
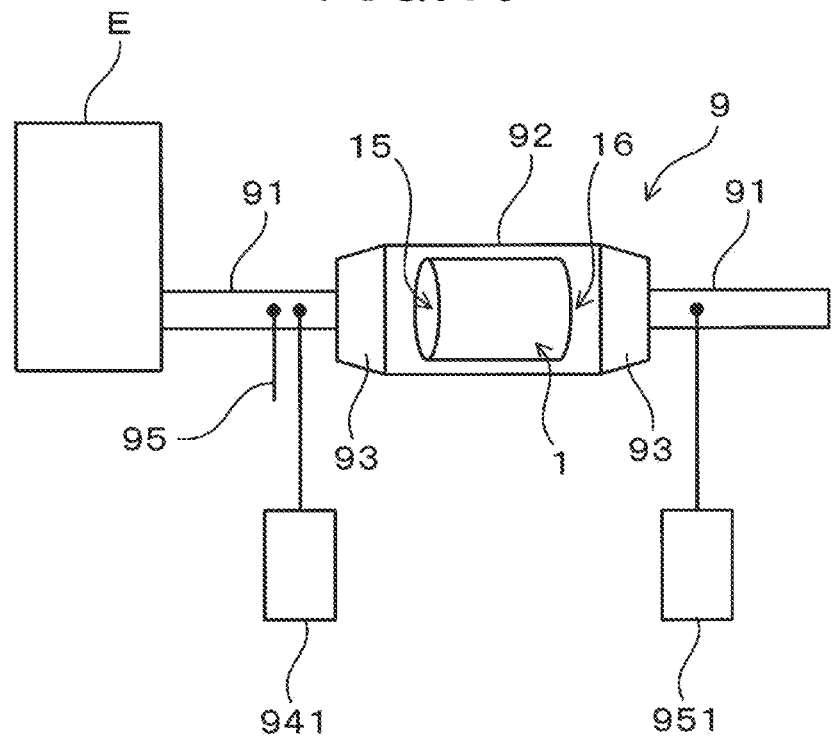
FIG. 16 illustrates a method of measuring the initial PM collection efficiency in an experimental example.

The initial PM collection efficiency was measured as detailed below. As shown in FIG. 16, a test device 9 was prepared including pipes 91, a case 92 that contains the sample exhaust gas purification filter 1, and cones 93 that connect the pipes 91 and the case 92. The pipe 91 upstream of the case 92 is connected to an engine E that generates exhaust gas. In the present experimental example, the engine E used was a gasoline direct injection engine (displacement: 2.0 L, turbocharged, four-cylinder). The pipe 91 upstream of the case 92 was provided with an upstream PM particle counter 941 and a temperature sensor 95. The pipe 91 downstream of the case 92 was provided with a downstream PM particle counter 951. Each of the upstream PM particle counter 941 and the downstream PM particle counter 951 was an AVL-489, manufactured by AVL List GmbH. The exhaust gas emitted from the engine E flowed through the sample exhaust gas purification filter 1. During this time, the number of PM particles in the exhaust gas before flowing into the sample exhaust gas purification filter 1, $N_{in}$, and the number of PM particles in the exhaust gas after flowing out of the sample exhaust gas purification filter 1, $N_{out}$, were measured, and the initial PM collection efficiency was calculated from the formula: $100 \times \{1-(N_{in}-N_{out})/N_{in}\}$. The measurements were performed under the conditions: a temperature of about 500° C. and an intake airflow rate of 25 g/sec. The measurements were performed using the exhaust gas purification filter 1 in the initial state without PM accumulated, and coated with the catalyst.

(Initial Pressure Drop)

Figure 17:
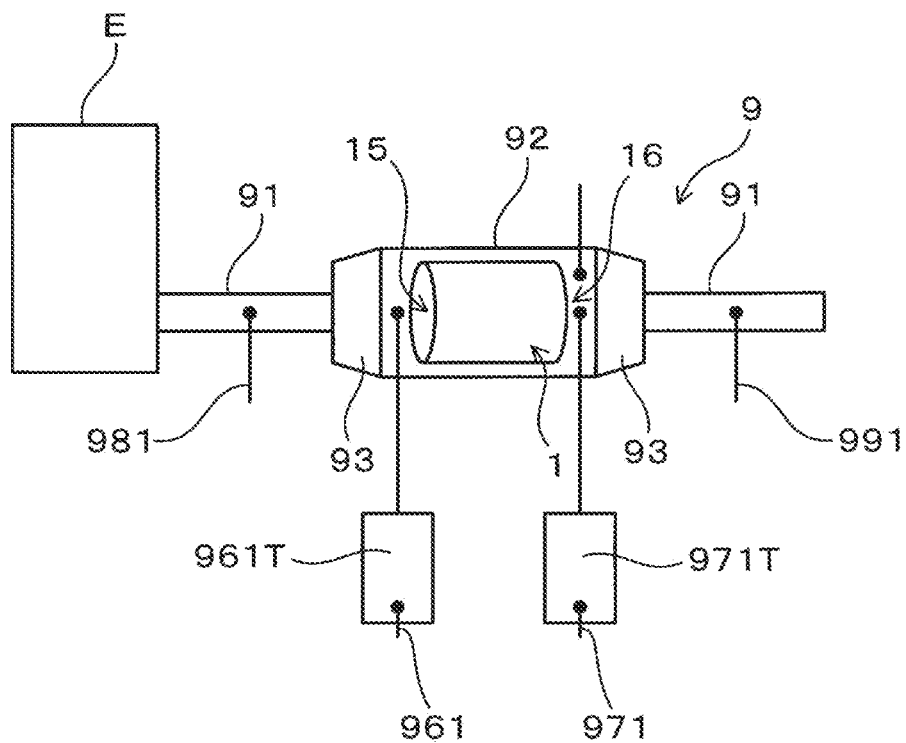
FIG. 17 illustrates a method of measuring a pressure drop in the experimental example.

The initial pressure drop was measured as detailed below. As shown in FIG. 17, a test device 9 was prepared including pipes 91, a case 92 that contains the sample exhaust gas purification filter 1, and cones 93 that connect the pipes 91 and the case 92. The pipe 91 upstream of the case 92 is connected to an engine E that generates exhaust gas. In the present experimental example, the engine E used was a gasoline direct injection engine (displacement: 2.0 L, turbocharged, four-cylinder). The test device 9 was provided with an upstream pressure sensor 961 and a downstream pressure sensor 971 to enable measurement of the pressures in front of and behind the sample exhaust gas purification filter 1. Each of the upstream pressure sensor 961 and the downstream pressure sensor 971 was a DG-932-C, manufactured by Tokyo Aircraft Instrument Co., Ltd. Note that sign 961T denotes a surge tank for the upstream pressure sensor 961, and sign 971T denotes a surge tank for the downstream pressure sensor 971. The pipe 91 upstream of the case 92 includes an upstream A/F sensor 981, and the pipe 91 downstream of the case 92 includes a downstream A/F sensor 991. The upstream pressure sensor 961 and the downstream pressure sensor 971 respectively measured the pressure in front of (upstream of) the sample exhaust gas purification filter 1 and the pressure behind (downstream of) the exhaust gas purification filter 1, and the difference between the measured pressures was defined as a pressure drop. The measurements were performed under the conditions: A/F: 14.6±0.3, intake airflow rate: 100 g/sec, and speed of engine E: 4,500 rpm. Regarding the temperatures during the measurements, the exhaust gas temperature was 700 to 750° C., and the central temperature of the sample exhaust gas purification filter 1 was 600 to 650° C. The measurements were performed using the exhaust gas purification filter 1 in the initial state without PM accumulated, and coated with the catalyst.

Measurement of Initial NOx Conversion Rate and NOx Conversion Rate after Endurance (Initial NOx Conversion Rate)

Figure 18:
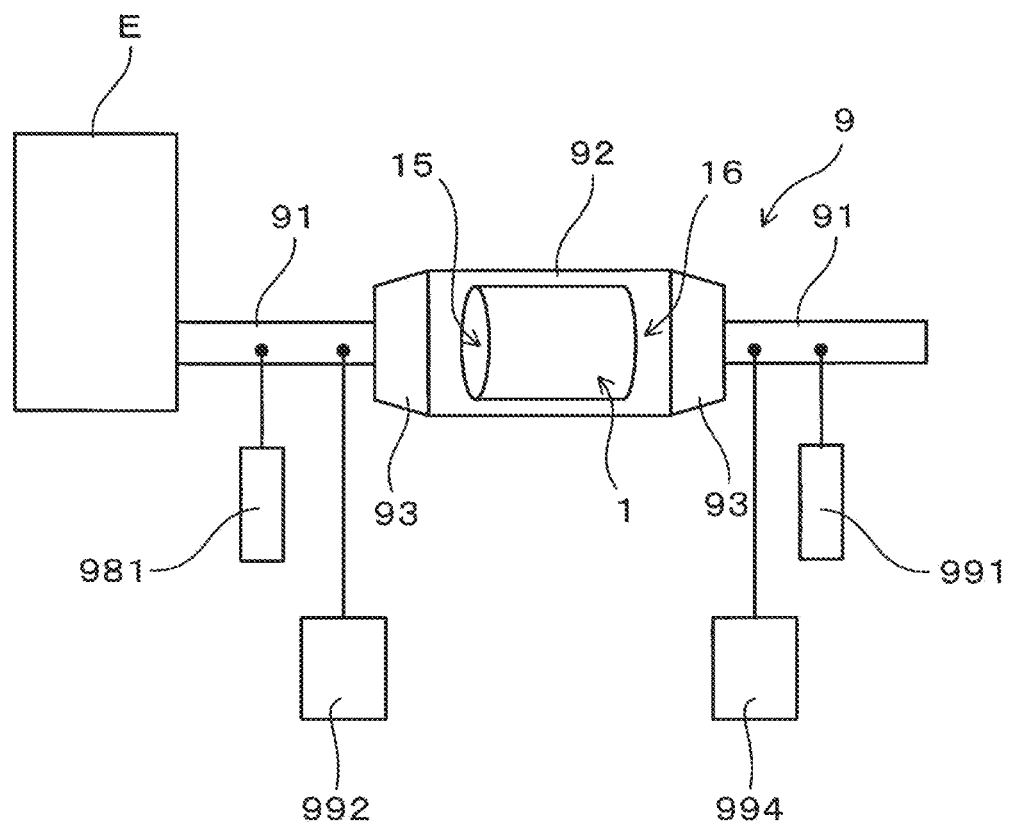
FIG. 18 illustrates a method of measuring a NOx conversion rate in the experimental example.

The initial NOx conversion rate was measured as detailed below. As shown in FIG. 18, a test device 9 was prepared including pipes 91, a case 92 that contains the sample exhaust gas purification filter 1, and cones 93 that connect the pipes 91 and the case 92. The pipe 91 upstream of the case 92 is connected to an engine E that generates exhaust gas. In the present experimental example, the engine E used was a gasoline direct injection engine (displacement: 2.0 L, naturally aspirated, four-cylinder). The pipe 91 upstream of the case 92 was provided with an upstream gas concentration meter 992 for measuring the inlet NOx concentration of a flow into the exhaust gas purification filter 1, and an upstream A/F sensor 981 for measuring the inlet A/F level of a flow into the exhaust gas purification filter 1. The pipe 91 downstream of the case 92 was provided with a downstream gas concentration meter 994 for measuring the outlet NOx concentration of a flow from the exhaust gas purification filter 1, and a downstream A/F sensor 991 for measuring the outlet A/F level of a flow from the exhaust gas purification filter 1. Each of the upstream gas concentration meter 992 and the downstream gas concentration meter 994 was a MEXA-7500, manufactured by HORIBA, Ltd. Each of the upstream A/F sensor 981 and the downstream A/F sensor 991 was a MEXA730λ, manufactured by HORIBA, Ltd. The exhaust gas emitted from the engine E flowed through the sample exhaust gas purification filter 1. Then, the A/F value was controlled to 14.4 while the A/F ratio was being monitored with the upstream A/F sensor 981 and the downstream A/F sensor 991, and the NOx concentration in the exhaust gas was measured under the conditions: the intake airflow rate: 10 g/s and the speed of the engine E: 1,500 rpm. The A/F value of 14.4 is the most frequent A/F value at startup during driving on the WLTC (Worldwide-harmonized Light Vehicles Test Cycle) mode. The conditions of the intake airflow rate of 10 g/s and the engine speed of 1,500 rpm simulated driving conditions at the startup of the engine E, under which the exhaust gas temperatures were in a low temperature range, for example, from 250° C. to 450° C. Then, the inlet NOx concentration measured by the upstream gas concentration meter 992 and the outlet NOx concentration measured by the downstream gas concentration meter 994 were used to calculate the initial NOx conversion rate based on the following formula:

Initial NOx conversion rate=100×(Inlet NOx concentration−Outlet NOx concentration)/Inlet NOx concentration.

(NOx Conversion Rate after Endurance)

The NOx conversion rate after endurance was measured as detailed below. A sample exhaust gas purification filter was installed in the exhaust passage of a gasoline direct injection engine (displacement: 2.0 L, naturally aspirated, four-cylinder). Then, the cycle of a PM accumulation process followed by a regeneration process was repeated 360 times (=3,600 min/10 min). In the PM accumulation process, PM was allowed to accumulate for nine minutes at an engine speed of 2,500 rpm and an intake manifold pressure of −10 kPa. In the regeneration process, the fuel supply was cut, and regeneration was performed by burning the PM for one minute at an engine speed of 2,500 rpm and an intake manifold pressure of −90 kPa without the filter temperature exceeding 900° C. The NOx conversion rate after the endurance was calculated in the same manner as the method for measuring the initial NOx conversion rate except that each sample after the above endurance was used. Note that the NOx conversion rate after the endurance is calculated based on the following formula:

Post-endurance NOx conversion rate=100×(Inlet NOx concentration for post-endurance sample−Outlet NOx concentration for post-endurance sample)/Inlet NOx concentration for post-endurance sample Evaluation In the present experimental example, when the initial PM collection efficiency was less than 70%, or the initial pressure drop was more than 7 kPa, the sample was determined to have failed to maintain the initial PM collection efficiency or reduce the initial pressure drop, and rated D. Even with the initial PM collection efficiency being 70% or more and the initial pressure drop being 7 kPa or less, when the initial NOx conversion rate was less than 95%, the sample was determined to have failed to achieve a higher initial NOx conversion rate, and rated C. When the initial PM collection efficiency was 70% or more, the initial pressure drop was 7 kPa or less, and the initial NOx conversion rate was 95% or more, the sample was determined to have achieved a higher initial NOx conversion rate while maintaining the initial PM collection efficiency and reducing the initial pressure drop. Then, when the initial NOx conversion rate was 95% or more and less than 96%, the sample was rated B. When the initial NOx conversion rate was 96% or more and less than 97%, the sample was rated B+. When the initial NOx conversion rate was 97% or more and less than 98%, the sample was rated A. When the initial NOx conversion rate was 98% or more, the sample was rated A+.

Figure 19:
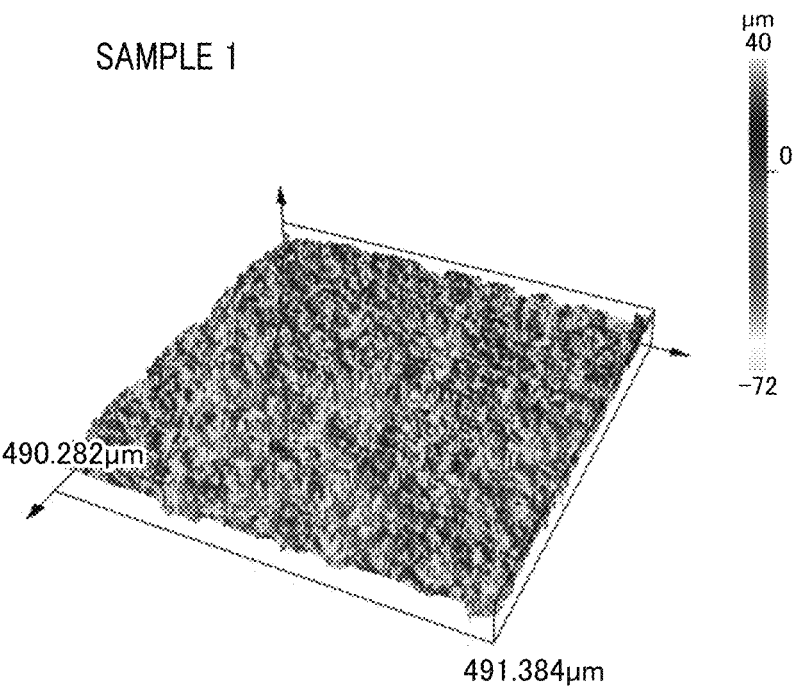
FIG. 19 is a three-dimensional image of the irregularities of a partition surface facing incoming exhaust gas, the image taken from the exhaust gas purification filter of sample 1 during surface roughness measurement in the experimental example.
Figure 20:
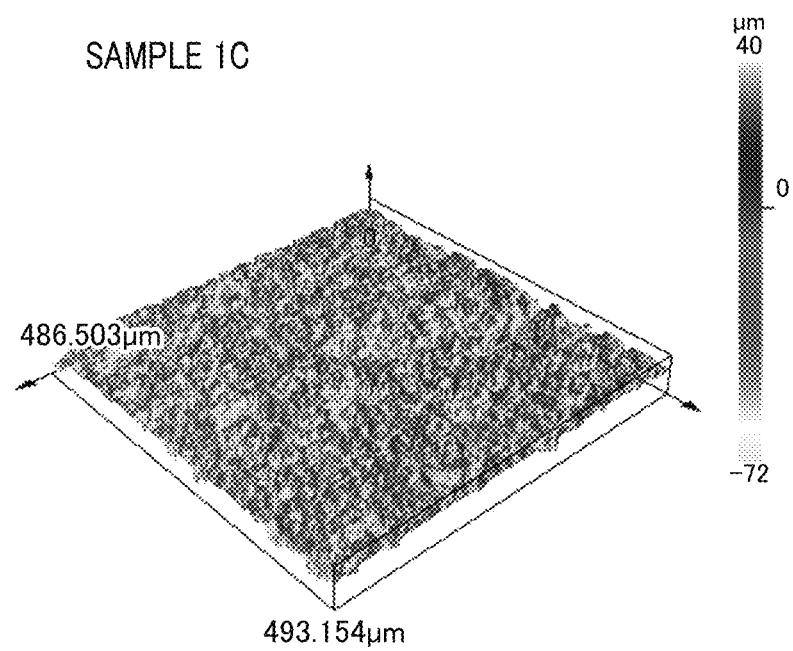
FIG. 20 is a three-dimensional image of the irregularities of a partition surface facing incoming exhaust gas, the image taken from the exhaust gas purification filter of sample 1C during surface roughness measurement in the experimental example.
Figure 21:
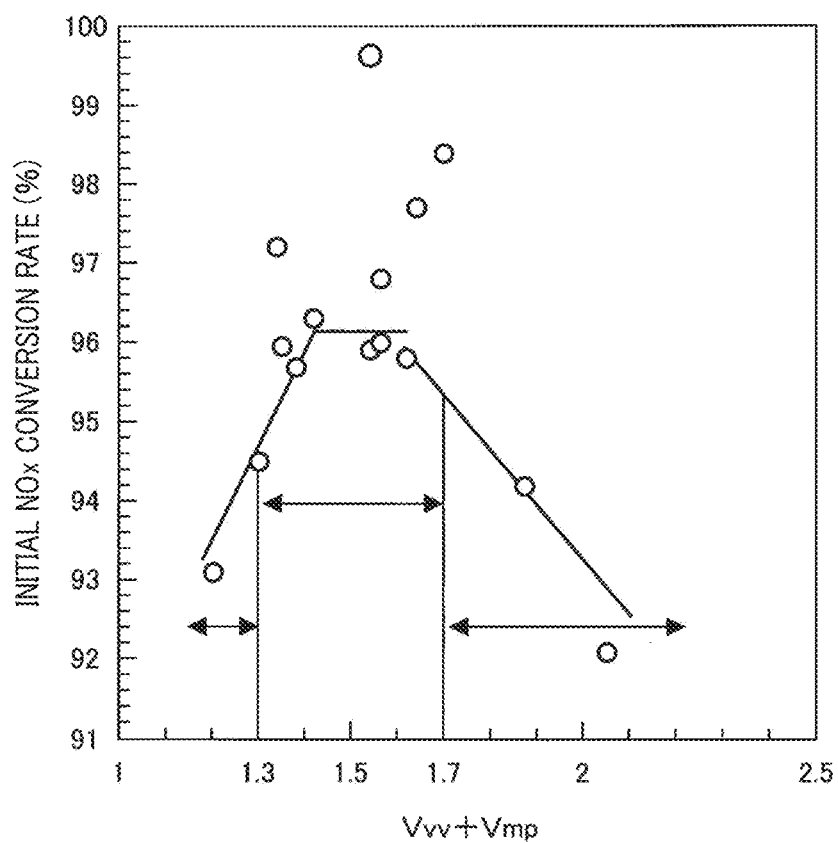
FIG. 21 shows the relationship found in the experimental example between the total value of the void volume Vvv of the reduced dale and the peak material volume Vmp of a partition surface determined in noncontact surface roughness measurement (horizontal axis), and the initial NOx conversion rate (vertical axis)

The results of the above experiment are summarized in Table 1. FIG. 19 shows a three-dimensional image of the irregularities of the partition surface facing incoming exhaust gas in the exhaust gas purification filter of sample 1, which is taken as a representative of samples 1 to 8. For comparison, FIG. 20 shows a three-dimensional image of the irregularities of the partition surface facing incoming exhaust gas in the exhaust gas purification filter of sample 1C. FIG. 21 shows the relationship between the total value of the void volume Vvv of the reduced dale and the material volume Vmp of the reduced peak (horizontal axis), and the initial NOx conversion rate (vertical axis). FIG. 22 shows the relationship between the total value of the void volume Vvv of the reduced dale and the material volume Vmp of the reduced peak (horizontal axis), and the NOx conversion rate after the endurance (vertical axis).

than the lower limit defined in the present disclosure, the initial NOx conversion rate is much lower. This is because the surface of the partition 12 with quite small irregularities provides an insufficient surface area effective for NOx conversion. It has also been found that with the total value of the volumes Vvv and Vmp of the partition surface higher than the upper limit defined in the present disclosure, the initial NOx conversion rate is also much lower. This is because the partition surface with quite large irregularities causes the exhaust gas to flow intensively in extremely deep recesses and have a higher flow rate, increasing the likeli-

TABLE 1

| | Partition Characteristics | | | | | | | | | |
|---|---|---|---|---|---|---|---|---|---|---|
| | Total Value of Void volume Vvv of reduced dale and Material volume Vmp of reduced peak ($\mu m^3/\mu m^2$) | Porosity (%) | Mean pore size A ($\mu m$) | Average Diameter of Surface Opening B ($\mu m$) | B/A | Communication Channel Count (Number)/ $mm^2$ of Partition | Initial NOx Conversion Rate (%) | Post-endurance NOx Conversion Rate (%) | Initial PM Collection Efficiency (%) | Initial Pressure Drop (kPa) | Evaluation |
| Sample 1C | 1.20 | 64 | 13 | 10.4 | 0.8 | 4132 | 93.1 | 90.7 | 84.6 | 6.8 | C |
| Sample 2C | 1.30 | 64 | 16 | 15.3 | 0.96 | 4853 | 94.5 | 91.1 | 77.4 | 6.4 | C |
| Sample 1 | 1.54 | 64 | 19 | 15.9 | 0.84 | 4758 | 99.6 | 92.6 | 70.6 | 6 | A+ |
| Sample 2 | 1.70 | 64 | 18 | 10.1 | 0.56 | 4167 | 98.4 | 92.2 | 73.5 | 5.8 | A+ |
| Sample 3C | 1.88 | 64 | 20 | 22.8 | 1.14 | 3505 | 94.2 | 86.2 | 73.1 | 5.2 | C |
| Sample 4C | 2.05 | 56 | 19 | 14.2 | 0.75 | 4863 | 92.1 | 82.1 | 70.2 | 6.4 | C |
| Sample 3 | 1.42 | 56 | 18 | 15.8 | 0.88 | 5864 | 96.3 | 91.3 | 71.4 | 6.5 | A |
| Sample 4 | 1.56 | 64 | 17 | 9.1 | 0.54 | 3647 | 96.8 | 91.8 | 75.3 | 6.3 | A |
| Sample 5 | 1.64 | 56 | 14 | 10.6 | 0.76 | 6143 | 97.7 | 92.7 | 71.4 | 6.9 | B+ |
| Sample 6 | 1.34 | 64 | 13 | 10.4 | 0.8 | 3279 | 97.2 | 92.2 | 83.1 | 6.7 | B+ |
| Sample 7 | 1.38 | 64 | 17 | 15.7 | 0.92 | 6239 | 95.7 | 90.7 | 76.4 | 6.4 | B |
| Sample 8 | 1.61 | 64 | 18 | 8.6 | 0.48 | 3470 | 95.8 | 90.8 | 72.8 | 6.2 | B |
| Sample 5C | 1.54 | 64 | 21 | 17.1 | 0.81 | 4756 | 95.9 | 90.9 | 68.4 | 5.5 | D |
| Sample 6C | 1.56 | 64 | 11 | 7.4 | 0.67 | 4517 | 96 | 91 | 89.4 | 7.2 | D |
| Sample 7C | 1.35 | 48 | 18 | 14.8 | 0.82 | 3624 | 95.9 | 90.9 | 61.3 | 8.4 | D |
| Sample 8C | 1.36 | 46 | 18 | 14.6 | 0.81 | 3598 | 95.9 | 90.9 | 60.1 | 8.5 | D |

Table 1, FIG. 21, and FIG. 22 have revealed the following. The exhaust gas purification filters of samples 1C to 4C, in which the total value of the void volume Vvv of the reduced dale and the material volume Vmp of the reduced peak of the partition surface facing incoming exhaust gas is out of the specific range defined in the present disclosure, have failed to achieve an improved initial NOx conversion rate. The exhaust gas purification filters of samples 5C and 6C, in which the mean pore size of the partition is out of the specific range defined in the present disclosure, have failed to maintain the initial PM collection efficiency or reduce the initial pressure drop with the catalyst layers formed. The exhaust gas purification filters of samples 7C and 6C, in which the porosity of the partition is out of the specific range defined in the present disclosure, have failed to maintain the initial PM collection efficiency and reduce the initial pressure drop with the catalyst layers formed.

In contrast, the exhaust gas purification filters of samples 1 to 8 with the catalyst layers formed, in which the total value of the volumes Vvv and Vmp of the partition surface, the mean pore size of the partition, and the porosity of the partition are within the specific ranges defined in the present disclosure, achieved a higher initial NOx conversion rate while maintaining the initial PM collection efficiency and reducing the initial pressure drop, without increasing the amount of catalyst (even with the same amount of catalyst).

In particular, as shown in FIG. 21, it has been found out that with the total value of the volumes Vvv and Vmp of the partition surface within the specific range defined in the present disclosure, the initial NOx conversion rate is higher. In contrast, it has been found out that with the total value of the volumes Vvv and Vmp of the partition surface lower hood of unreacted exhaust gas flowing through the partition. The plot line drawn in FIG. 21 refers to the line obtained with the same ratio of the average diameter of the surface openings of the pores in the partition surface to the mean pore size of the partition, and the same communication channel count per square millimeter of the partition.

Regarding the advantageous effects of the improvement in the NOx conversion rate by 1% under the present test conditions, since an engine emits about 3,000 to 4,000 ppm NOx, 1% superiority in the NOx conversion rate results in a difference of 30 to 40 ppm in NOx emissions, and thus shows a great influence in view of strict automobile emission regulations.

Table 1 also indicates that when the ratio (B/A) of average diameter B of the surface openings of the pores in the partition surface to mean pore size A of the partition is 0.55 or more and 0.85 or less, it is easier to achieve a higher NOx conversion efficiency while maintaining the PM collection efficiency and reducing the pressure drop. This is because in catalyst coating, the partition surface was coated with a larger amount of catalyst, and the pore wall surfaces of the communication channels in the partition were coated with thinner catalyst layers, thus facilitating the achievement of the NOx conversion effect on the partition surface and the prevention of the clogging of the communication channels with catalyst.

Table 1 also indicates that when the communication channel count per square millimeter of the partition is 3,800 or more and 6,000 or less, it is easier to achieve an improved NOx conversion efficiency. This is because the increase in the number of communication channels regulated the flow rate of exhaust gas G flowing in the partition to increase the likelihood of ensuring enough time for reaction between the exhaust gas and the catalyst, and also the increase in the number of communication channels reduced the possibility of the communication channels being blocked by catalyst when the catalyst was supported, thus resulting in a reduction in catalyst blocking communication channels and unable to contribute to NOx conversion.

Samples 1 to 8 have also prevented a significant reduction in their post-endurance NOx conversion efficiency. This is because the small irregularities of the partition surface are less likely to cause uneven accumulation of collected PM, and have prevented a localized temperature increase in the partition during regeneration for PM, resulting in little likelihood of the catalyst having localized thermal degradation during long-term use.

The present disclosure is not limited to the embodiments and experimental examples described above, and may be modified variously without departing from the spirit and scope thereof. In other words, although the present disclosure has been described in accordance with the embodiments, it will be understood that this disclosure is not limited to the embodiments or the structures. This disclosure encompasses various modifications and alterations falling within the range of equivalence. Additionally, various combinations and forms as well as other combinations and forms with one, more than one, or less than one element added thereto also fall within the scope and spirit of the present disclosure.

What is claimed is:

1. An exhaust gas purification filter comprising:
   a plurality of cells extending in a filter axial direction;
   a porous partition separating and defining the plurality of cells; and
   a sealing section sealing the plurality of cells alternately at both filter ends,
   wherein the partition has a void volume of a reduced dale, Vvv, and a material volume of a reduced peak, Vmp, being volume parameters determined in noncontact surface roughness measurement on a surface of the partition, with a total value of the volume Vvv and the volume Vmp being more than 1.3 $\mu m^3/\mu m^2$ and 1.7 $\mu m^3/\mu m^2$ or less;
   the partition has a mean pore size of 12 µm or more and 20 µm or less;
   the partition has a porosity of 50% or more and 75% or less; and
   the partition has a ration of an average diameter of surface openings of pores in the surface of the partition to the mean pore size of the partition, the ratio being 0.55 or more and 0.85 or less, the ratio being adjusted before the exhaust gas purification filter supports the catalyst.

2. The exhaust gas purification filter according to claim 1, wherein
   the partition includes communication channels allowing communication between adjacent ones of the cells, and
   the partition has a communication channel count being a number of communication channels per square millimeter of the partition, the count being 3,800 or more and 6,000 or less.

* * * * *